United States Patent
Onishi

(10) Patent No.: US 10,404,328 B2
(45) Date of Patent: Sep. 3, 2019

(54) CONTROL DEVICE, POWER TRANSMITTING DEVICE, CONTACTLESS POWER TRANSMISSION SYSTEM, AND ELECTRONIC APPARATUS

(71) Applicant: SEIKO EPSON CORPORATION, Shinjuku-ku, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 130 days.

(21) Appl. No.: 15/790,526

(22) Filed: Oct. 23, 2017

(65) Prior Publication Data
US 2018/0123646 A1  May 3, 2018

(30) Foreign Application Priority Data
Oct. 28, 2016  (JP) .................. 2016-211720

(51) Int. Cl.
| | | |
|---|---|---|
| *H04B 5/00* | (2006.01) | |
| *H02J 50/10* | (2016.01) | |
| *H02J 7/02* | (2016.01) | |
| *H02J 50/80* | (2016.01) | |
| *H02J 50/70* | (2016.01) | |

(52) U.S. Cl.
CPC ............ *H04B 5/0093* (2013.01); *H02J 7/025* (2013.01); *H02J 50/10* (2016.02); *H02J 50/70* (2016.02); *H02J 50/80* (2016.02)

(58) Field of Classification Search
CPC ........ H04B 5/0093; H02J 50/10; H02J 7/025; H02J 50/80; H02J 50/70
See application file for complete search history.

(56) References Cited

FOREIGN PATENT DOCUMENTS

| JP | 2004-229406 A | 8/2004 |
|---|---|---|
| JP | 2009-252970 A | 10/2009 |
| JP | 2016-005393 A | 1/2016 |

*Primary Examiner* — Robert L Deberadinis
(74) *Attorney, Agent, or Firm* — Oliff PLC

(57) ABSTRACT

A control device controls a first power transmission driver that applies a first drive signal to a first primary coil and a second power transmission driver that applies a second drive signal to a second primary coil. When intermittent power transmission is performed by applying the second drive signal in a period in which normal power transmission is performed by applying the first drive signal, a controller of the control device sets the phase difference between the first drive signal and the second drive signal to a predetermined phase difference.

13 Claims, 17 Drawing Sheets

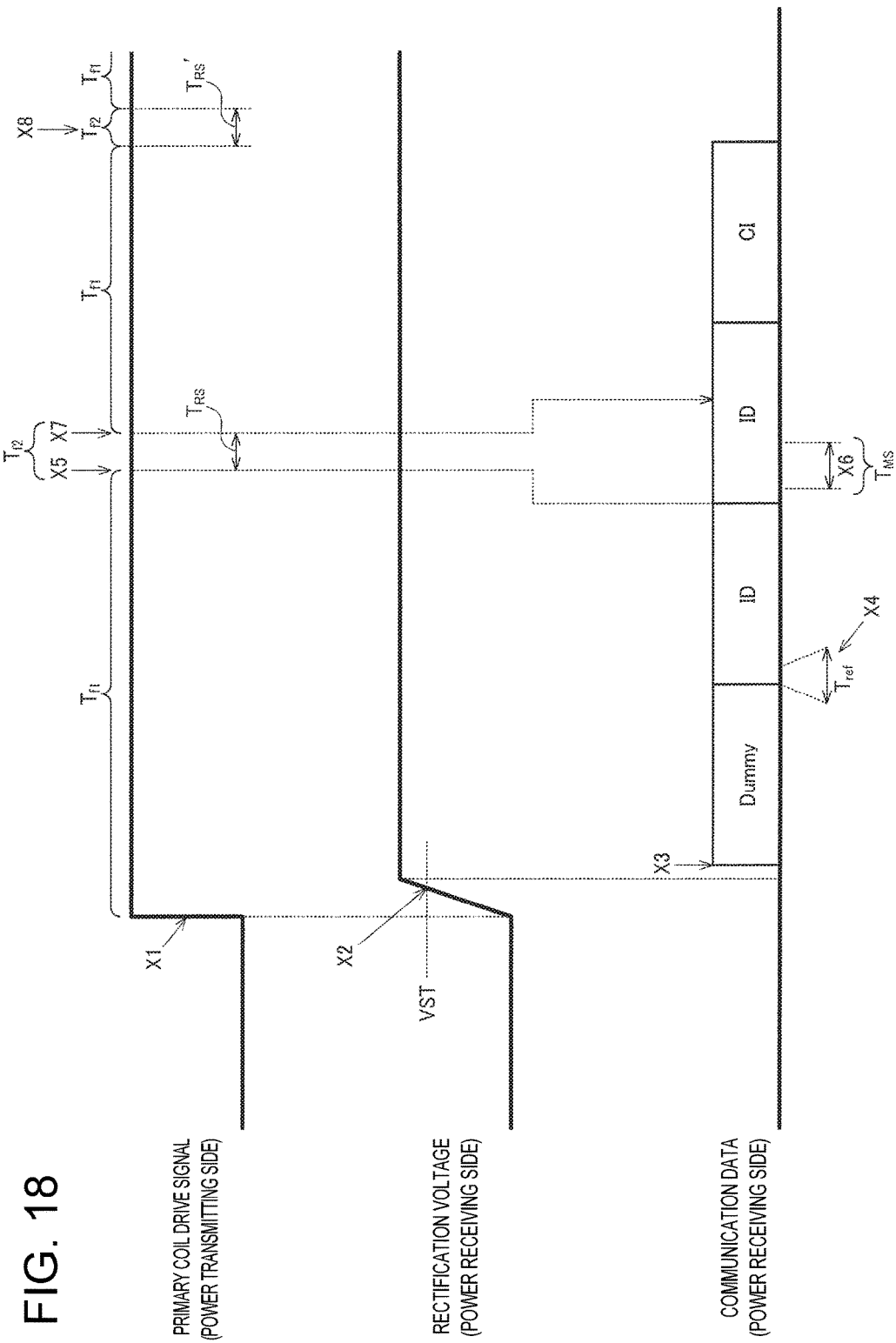

CONTROL DEVICE, POWER TRANSMITTING DEVICE, CONTACTLESS POWER TRANSMISSION SYSTEM, AND ELECTRONIC APPARATUS

BACKGROUND

1. Technical Field

The present invention relates to control devices, power transmitting devices, contactless power transmission systems, electronic apparatuses, and the like.

2. Related Art

In recent years, contactless power transmission (wireless power transmission), using electromagnetic induction, that enables power transmission even without metal portions being in contact has attracted attention. Power supply for electronic apparatuses such as household appliances, mobile terminals, and electric cars has been proposed as an application example of this contactless power transmission.

Known technologies of the contactless power transmission include technologies disclosed in JP-A-2016-5393, JP-A-2009-252970, and JP-A-2004-229406, for example. JP-A-2016-5393 discloses a technology that can transmit power to two apparatuses independently. In this technology, first and second coils are arrange side-by-side on a flat surface on a primary (power transmission) side, the phase difference between first and second drive signals that respectively drive the first and second coils is set to 180 degrees, and thereby the leakage magnetic field is reduced. JP-A-2009-252970 and JP-A-2004-229406 disclose technologies in which power is transmitted to one apparatus by a plurality of coils on a primary side. In these technologies, a plurality of coils are arranged in an overlapped manner on the primary side, and the phase difference between first and second drive signals that respectively drive the first and second coils that are overlapped and adjacent to each other is set to 90 degrees. The technology disclosed in JP-A-2009-252970 improves the transmission efficiency (minimum value thereof), and the technology disclosed in JP-A-2004-229406 can arbitrarily increase the coupling surface of a device on the primary side.

In the case where a plurality of coils are provided on a primary side (power transmitting device) and power is transmitted to a plurality of apparatuses on a secondary side (power receiving devices) in contactless power transmission, it is possible that communication or power transmission will not be appropriately performed between the primary side and the secondary side.

For example, landing detection of an apparatus on the secondary side, normal power transmission, removal detection of the apparatus on the secondary side, and the like are envisioned as control statuses on the primary side, and these controls are performed on the plurality of apparatuses on the secondary side independently. In this case, when power is transmitted to the apparatuses on the secondary side, the relation between phases of the drive signals that respectively drive the coils changes randomly, and if the phases become phases that have a specific phase difference, a malfunction may occur in communication or power transmission. For example, when normal power transmission to a first apparatus on the secondary side is performed, and intermittent power transmission (such as landing detection or removal detection, for example) to a second apparatus on the secondary side is performed, if the phase difference of the drive signals is 90 degrees, a communication error may occur, and if the phase difference of the drive signals is 180 degrees, the power transmission efficiency decreases, and power may not be appropriately supplied to a load.

SUMMARY

According to some aspects of the invention, a control device, a power transmitting device, a contactless power transmission system, an electronic apparatus, and the like can be provided that can appropriately perform communication and power transmission between an apparatus on a primary side and a plurality of apparatuses on a secondary side.

One aspect of the invention relates to a control device that controls a first power transmission driver that applies a first drive signal to a first primary coil and a second power transmission driver that applies a second drive signal to a second primary coil. The control device includes a controller. When intermittent power transmission is performed by applying the second drive signal in a period in which normal power transmission is performed by applying the first drive signal, the controller sets a phase difference between the first drive signal and the second drive signal to a predetermined phase difference.

According to one aspect of the invention, when intermittent power transmission is performed by the second power transmission driver that applies the second drive signal to the second primary coil in a period in which normal power transmission is performed by the first power transmission driver that applies the first drive signal to the first primary coil, the phase difference between the first drive signal and the second drive signal is set to the predetermined phase difference. Accordingly, the communication and the power transmission between an apparatus on the primary side and a plurality of apparatuses on the secondary side can be appropriately performed. For example, in the case where normal power transmission or communication is affected at a specific phase difference (specific phase difference range), appropriate communication or power transmission can be performed by setting a phase difference other than the specific phase difference (phase difference range) to the predetermined phase difference.

Also, in one aspect of the invention, the predetermined phase difference may be 0 degrees.

A case is assumed in which normal power transmission is performed by the first power transmission driver, and intermittent power transmission is performed by the second power transmission driver. In this case, when the phase difference between the first drive signal and the second drive signal is 90 degrees, the communication with the power receiving device via the first primary coil may be adversely affected, and when the phase difference between the first drive signal and the second drive signal is 180 degrees, the power transmission to the power receiving device via the first primary coil may be adversely affected. According to one aspect of the invention, when normal power transmission is performed by the first power transmission driver and intermittent power transmission is performed by the second power transmission driver, since the phase difference between the first drive signal and the second drive signal is set to 0 degrees, the aforementioned adverse effect can be reduced.

Also, in one aspect of the invention, the controller may variably set the phase difference between the first drive signal and the second drive signal.

In this way, according to the control status and the operation mode of the contactless power transmission system, for example, the phase difference between the first drive signal and the second drive signal can be variably set.

Also, in one aspect of the invention, the controller may variably set the phase difference such that the phase difference will be one of at least two of 0 degrees, 90 degrees, and 180 degrees.

In this way, according to the control status and the operation mode of the contactless power transmission system, for example, the phase difference between the first drive signal and the second drive signal can be variably set to an appropriate phase difference from 0 degrees, 90 degrees, and 180 degrees. For example, in the case where a communication error may occur, the phase difference can be set to 0 degrees or 180 degrees with which the occurrence of a communication error can be suppressed, and in the case where power transmission may be affected, the phase difference can be set to 90 degrees with which the influence on the power transmission can be suppressed.

Also, in one aspect of the invention, the controller may differs the phase difference between the first drive signal and the second drive signal when normal power transmission is performed by the first power transmission driver and intermittent power transmission is performed by the second power transmission driver from the phase difference between the first drive signal and the second drive signal when normal power transmission is performed by the first power transmission driver and the second power transmission driver.

When normal power transmission is performed by the first power transmission driver and the second power transmission driver, the possibility that interference to the communication will occur due to intermittent power transmission is low. According to one aspect of the invention, when normal power transmission is performed by the first power transmission driver and the second power transmission driver, the phase difference with which the influence on the power transmission can be reduced can be set regardless of whether or not the occurrence of communication error is to be reduced.

Also, in one aspect of the invention, the controller may set the phase difference to 0 degrees when normal power transmission is performed by the first power transmission driver and intermittent power transmission is performed by the second power transmission driver, and set the phase difference to 90 degrees when normal power transmission is performed by the first power transmission driver and the second power transmission driver.

In this way, when normal power transmission is performed by the first power transmission driver, and intermittent power transmission is performed by the second power transmission driver, the occurrence of communication error caused by the influence of intermittent power transmission can be suppressed. Also, when normal power transmission is performed by the first power transmission driver and the second power transmission driver, the fluctuation in rectification voltage caused by the interference between power transmissions can be suppressed.

Also, in one aspect of the invention, the control device may include a first communication unit that receives communication data from a first power receiving device by detecting a current that flows to the first power transmission driver from a power supply, and a second communication unit that receives communication data from a second power receiving device by detecting a current that flows to the second power transmission driver from the power supply.

When the second power transmission driver performs intermittent power transmission, a rush current flows to the power transmission driver from the power supply at a start timing and an end timing of the power transmission. Therefore, an error caused by the rush current may occur in the reception processing performed by the communication unit in which a current flowing to the power transmission driver from the power supply is detected. The possibility that such an error occurs rises when the phase difference between the first drive signal and the second drive signal is a specific phase difference. In this regard, according to one aspect of the invention, the phase difference between the first drive signal and the second drive signal is set to the predetermined phase difference when normal power transmission is performed by the first power transmission driver and intermittent power transmission is performed by the second power transmission driver, and therefore the possibility that such an error described above will occur can be reduced.

Also, in one aspect of the invention, when communication is performed from a power transmitting device to a first power receiving device by changing the frequency of the first drive signal from a first power transmission frequency to a second power transmission frequency that is different from the first power transmission frequency, the control device may reset the phase difference between the first drive signal and the second drive signal to the predetermined phase difference after the communication.

When communication is performed from the power transmitting device to the first power receiving device by changing the frequency of the first drive signal to the second power transmission frequency, the phase difference between the first drive signal having the second power transmission frequency and the second drive signal having the first power transmission frequency shifts. That is, even if the phase difference was set to the predetermined phase difference before communication, the phase difference shifts from the predetermined phase difference as a result of performing the communication. In this regard, according to one aspect of the invention, the phase difference between the first drive signal and the second drive signal is reset to the predetermined phase difference after the communication by the first drive signal having the second power transmission frequency is performed. Accordingly, even if communication is performed from the power transmitting device to the power receiving device, the phase difference between the first drive signal and the second drive signal is reset to the predetermined phase difference, and therefore the adverse effect by the intermittent power transmission can be reduced.

Also, in one aspect of the invention, the controller may, after causing the first power transmission driver to transmit the first drive signal having the first power transmission frequency to the first power receiving device, when a first command is issued to the first power receiving device, cause the first power transmission driver to transmit the first drive signal having the second power transmission frequency during a period having a first length, and when a second command that is different from the first command is issued to the first power receiving device, cause the first power transmission driver to transmit the first drive signal having the second power transmission frequency during a period having a second length that is different from the first length.

In this way, in one aspect of the invention, the power transmission frequency is set to the second power transmission frequency in periods having the first and second lengths respectively corresponding to the first and second commands, and the communication for transmitting these commands is performed. When the length of the period changes, the shift in the phase difference between the first drive signal and the second drive signal takes various values. In this regard, according to one aspect of the invention, the phase difference between the first drive signal and the second drive signal is reset to the predetermined phase difference after the communication, and as a result, the shift in the phase difference between the first drive signal and the second drive signal can be corrected corresponding to the first and second commands, and the phase difference can be reset to the predetermined phase difference.

Also, another aspect of the invention relates to a power transmitting device including the control device according to any of the above descriptions.

Also, in another aspect of the invention, the power transmitting device may include a first placement portion onto which a first electronic apparatus that is to be charged by a power signal from the first primary coil is placed, and a second placement portion onto which a second electronic apparatus that is to be charged by a power signal from the second primary coil is placed.

In the case where the first and second placement portions onto which the first and second electronic apparatuses are respectively placed are provided in this way, it is possible that the magnetic field generated by a second primary coil provided in the second placement portion will interfere with the power transmission performed between the first electronic apparatus placed in the first placement portion and the power transmitting device. Due to such interference, an influence such as that the voltage of the power receiving device in the first electronic apparatus fluctuates may be incurred, for example. In this regard, since the phase difference between the first drive signal and the second drive signal is set to the predetermined phase difference, the phase difference can be set to a phase difference with which the possibility of incurring aforementioned influence is low, and therefore the aforementioned influence can be reduced.

Also, yet another aspect of the invention relates to a contactless power transmission system including the power transmitting device any of the above descriptions, a first power receiving device, and a second power receiving device. When normal power transmission to the first power receiving device is performed by applying the first drive signal and intermittent power transmission to the second power receiving device is performed by applying the second drive signal, the phase difference between the first drive signal and the second drive signal is set to a predetermined phase difference.

Also, yet another aspect of the invention relates to an electronic apparatus including the control device according to any of the above descriptions.

BRIEF DESCRIPTION OF THE DRAWINGS

The invention will be described with reference to the accompanying drawings, wherein like numbers reference like elements.

FIG. 18 is a diagram for illustrating an example of a method of notifying an issued command from a power transmitting device to a power receiving device when the power receiving device is landed.

DESCRIPTION OF EXEMPLARY EMBODIMENTS

Hereinafter, a preferred embodiment of the invention will be described in detail. Note that the embodiments described below are not intended to unduly limit the content of the invention recited in the claims, and all of the configurations described in the embodiments are not necessarily essential as solutions provided by the invention.

1. Exemplary Basic Configuration

Figure 1:
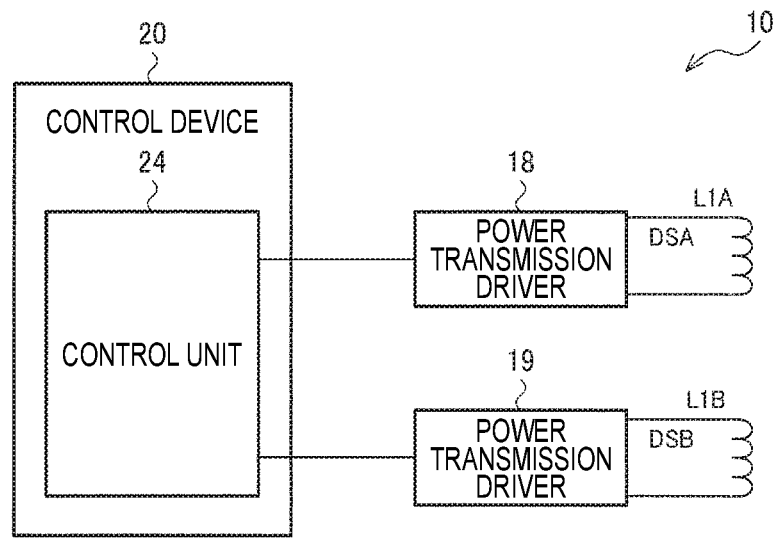
FIG. 1 shows an exemplary basic configuration of a control device of the present embodiment and a power transmitting device including the control device.

FIG. 1 shown an exemplary basic configuration of a control device of the present embodiment and a power transmitting device including the control device. A power transmitting device 10 includes a control device 20, power transmission drivers 18 and 19, and primary coils L1A and L1B (power transmission coils), and is a device that contactlessly transmits power to a power receiving device. Note that the configuration of the control device and the power transmitting devices of the present embodiment is not limited to the configuration in FIG. 1, and various modifications can be implemented such as omitting some of the constituent elements, and adding another constituent element. For example, the configuration may be such that three or more primary coils are included, and power can be transmitted to three or more power receiving devices.

The power transmission drivers 18 and 19 (first and second power transmission drivers) respectively apply drive signals DSA and DSB (first and second drive signals) to the primary coils L1A and L1B (first and second primary coils). The control device 20 includes a controller 24, and is a device that controls these power transmission drivers 18 and 19. When intermittent power transmission is performed by applying the drive signal DSB (to the power transmission driver 19) in a period in which normal power transmission is performed by applying the drive signal DSA (to the power transmission driver 18), the controller 24 sets the phase difference between the drive signal DSA and the drive signal DSB to a predetermined phase difference.

The drive signals DSA and DSB are each a signal that periodically changes at a given frequency that is set by the controller 24 or the like, for example, and is a sine wave, a square wave, or the like, for example. Specifically, the drive signals DSA and DSB are signals in which the voltage amplitude is controlled. The normal power transmission (power transmission) is power transmission for supplying power to a load of the power receiving device (or to the power receiving device itself), and is power transmission performed by continuously (non-intermittently) supplying the drive signal DSA to the primary coil L1A, for example. Note that the normal power transmission may include temporal interruption of power transmission. The intermittent power transmission is power transmission performed by intermittently supplying the drive signal DSB to the primary coil L1B. "Intermittently supplying" refers to alternatingly repeating non-supply and supply of power, and refers to repeating given power supply periods at a given interval, for example. For example, the intermittent power transmission is performed in removal detection in which removal of a power receiving device from a power transmitting device is detected, and in landing detection in which landing of a power receiving device on a power transmitting device is detected, which will be described later. Alternatively, the intermittent power transmission (transmission of power beacon) may be performed in a power saving state, or the intermittent power transmission may be performed as some kind of signal (power signal). Also, the period in which the normal power transmission is performed is a period (period from when normal power transmission is started until when it is ended) during which the normal power transmission continues. For example, the period is a period, in a communication check & charge state as shown in A2 in FIG. 12, from when normal power transmission is started until when normal power transmission is stopped due to a battery being fully charged or the removal of a power receiving device being detected.

Note that "when intermittent power transmission is performed by applying the drive signal DSB in a period in which normal power transmission is performed by applying the drive signal DSA, the phase difference between the drive signal DSA and the drive signal DSB is set to a predetermined phase difference" means that the phase difference between the drive signals DSA and DSB is set to a predetermined phase difference at least in the case stated above, and does not necessarily mean to perform classification. That is, the phase difference between the drive signals DSA and DSB may be set to a predetermined phase difference regardless of the case, or may be set to the predetermined phase difference according to the case.

In the present embodiment, in the power transmitting device 10 that can transit power to two power receiving devices, one power transmission driver 19 performs intermittent power transmission. In this case, the normal power transmission performed by the other power transmission driver 18 and the communication from a power receiving device to the power transmitting device via the primary coil L1A may be affected by the intermittent power transmission. In this regard, in the present embodiment, as a result of setting the phase difference between the drive signal DSA and the drive signal DSB to the predetermined phase difference, the influence of the intermittent power transmission described above can be reduced. That is, if normal power transmission or communication is affected at a specific phase difference (in a specific phase difference range), a phase difference other than the specific phase difference (out of the specific phase difference range) is set as the predetermined phase difference, and as a result, the influence of the intermittent power transmission can be reduced. Hereinafter, problems and the solution will be described in detail.

Figure 2:
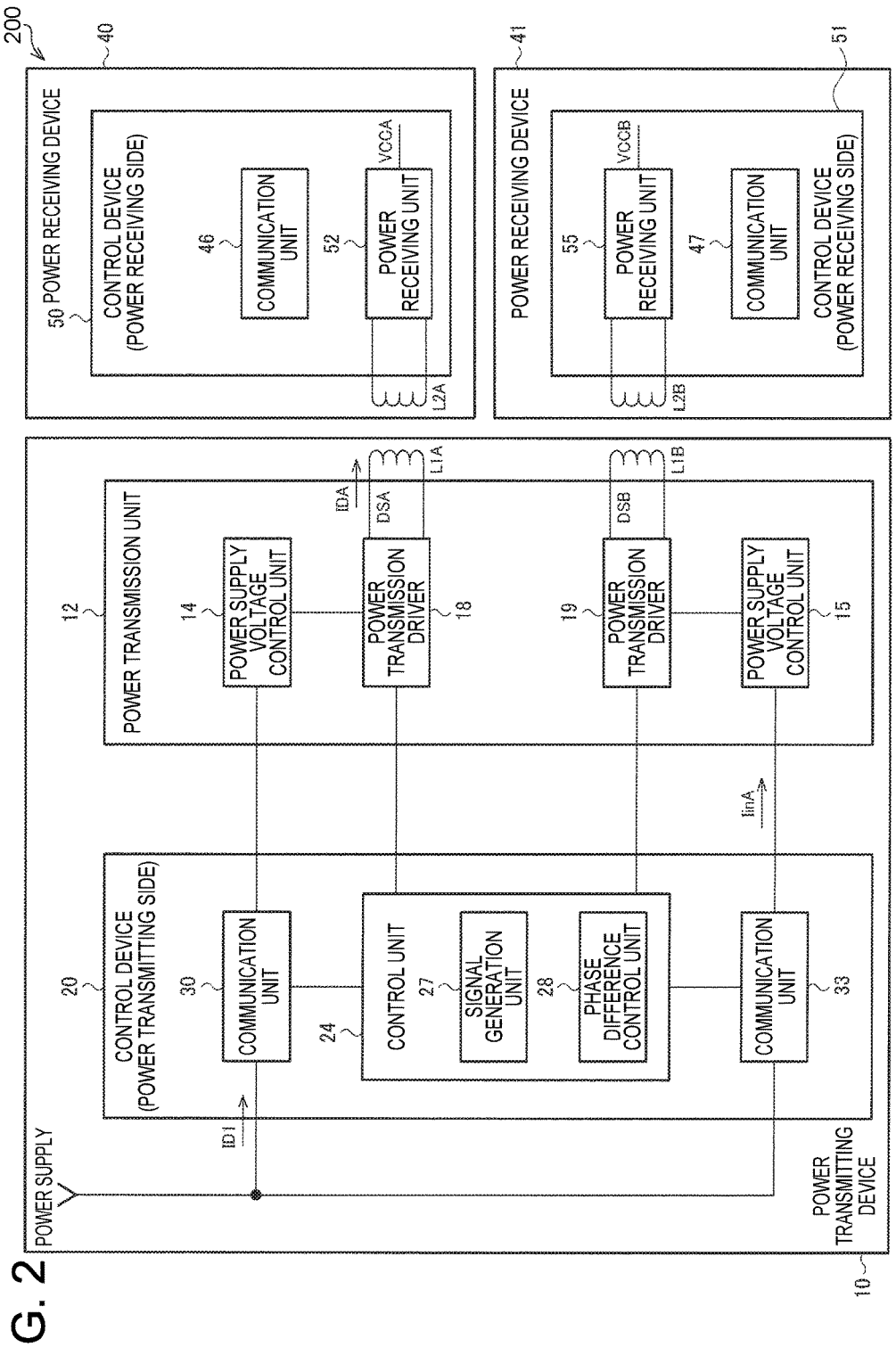
FIG. 2 shows an exemplary configuration of a power transmitting device, a power receiving device, and a contactless power transmission system including the same.

2. Power Transmitting Device, Power Receiving Device, and Contactless Power Transmission System FIG. 2 shows an exemplary configuration of a power transmitting device, a power receiving device, and a contactless power transmission system including them. A contactless power transmission system 200 includes the power transmitting device 10, a power receiving device 40 (first power receiving device), and a power receiving device 41 (second power receiving device). Note that the configuration of the power transmitting device, the power receiving device, and the contactless power transmission system of the present embodiment is not limited to the configuration in FIG. 2, and various modifications can be implemented such as those obtained by omitting some of the constituent elements, and adding another constituent element. For example, in the following, although a case where the power transmitting device 10 can transmit power to the two power receiving devices 40 and 41 will be described as an example, the power transmitting device may be capable of transmitting power to three or more power receiving devices.

The power transmitting device 10 includes the control device 20 (power transmitting side control device), a power transmitter 12 (power transmission circuit), and primary coils L1A and L1B. The power transmitting device 10 is a device that transmits power to the power receiving devices 40 and 41 through electromagnetic coupling between the primary coils L1A and L1B (power transmission coils) and secondary coils L2A and L2B (power reception coils).

The power receiving device 40 includes a control device 50 (power receiving side control device) and the secondary coil L2A. The power receiving device 41 includes a control device 51 (power receiving side control device) and the secondary coil L2B. The power receiving devices 40 and 41 are devices that receive power that is transmitted from the power transmitting device 10 through the electromagnetic coupling described above, and supply the received power to a battery or a circuit, for example.

The control device 20 of the power transmitting device 10 includes the controller 24 and communication units 30 and 33. The power transmitter 12 includes power transmission drivers 18 and 19 and power supply voltage controllers 14 and 15. The control devices 50 and 51 of the power receiving devices 40 and 41 respectively include power receiving units 52 and 55 and communication units 46 and 47.

The power receiving unit 52 receives power that is transmitted from the power transmission driver 18 via the primary coil L1A and the secondary coil L2A. The power receiving unit 55 receives power that is transmitted from the power transmission driver 19 via the primary coil L1B and the secondary coil L2B. That is, the power receiving units 52 and 55 respectively rectify signals (signals generated by electromotive force) received by the secondary coils L2A and L2B, and output rectification voltages VCCA and VCCB (received voltages).

The communication units 46 and 47 on the power receiving side transmit communication data from the respective power receiving devices 40 and 41 to the power transmitting device 10 using load modulation. Load modulation is a method in which the amplitude of the current that flows through the primary coil L1A or L1B is caused to change (be modulated) by changing the load on the power receiving side. The communication units 30 and 33 on the power transmitting side respectively receive communication data from the power receiving devices 40 and 41 by detecting currents that flow from the power supply to the power transmission drivers 18 and 19. That is, the communication units 30 and 33 receive communication data by detecting the change in current amplitude that is caused by load modulation on the power receiving side.

The power supply voltage controllers 14 and 15 respectively control the voltage amplitudes of the drive signals DSA and DSB so as to control transmitting power from the primary coils L1A and L1B. Specifically, the power supply voltage controllers 14 and 15 regulate the power supply voltage supplied from the power supply, and supplies the regulated voltages to the power transmission drivers 18 and 19, respectively. The communication units 30 and 33 respectively receive communication data from the power receiving devices 40 and 41 by detecting currents that flow to the power transmission drivers 18 and 19 from the power supply via the power supply voltage controllers 14 and 15.

Figure 3:
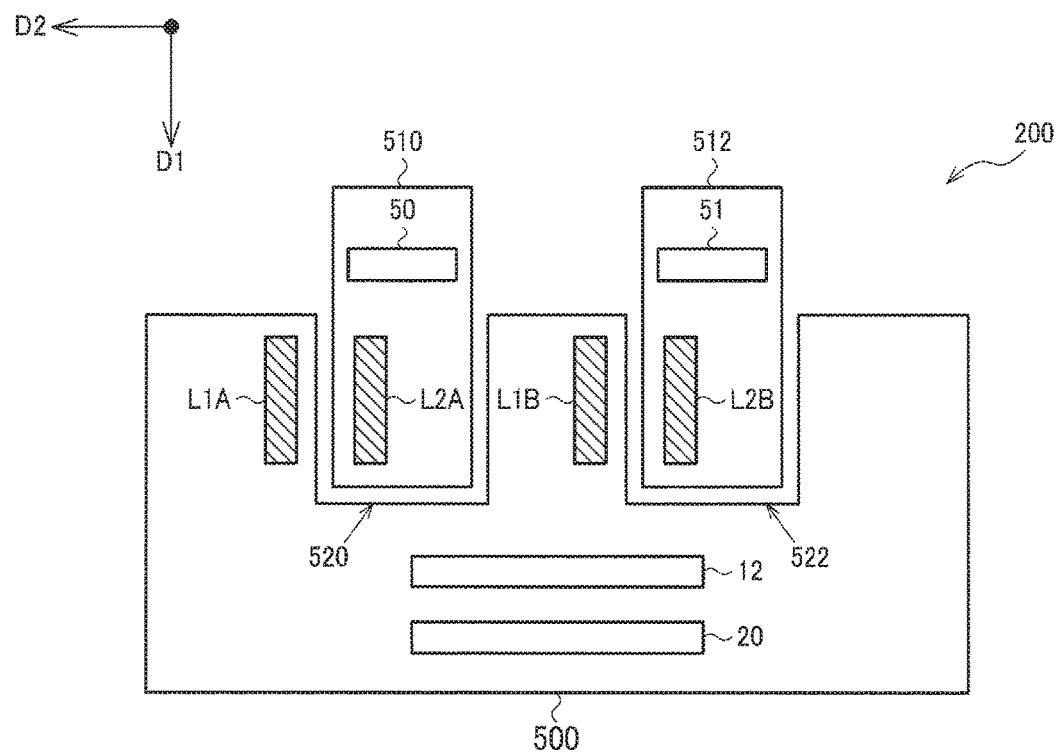
FIG. 3 shows an example of a contactless power transmission system of the present embodiment.

FIG. 3 shows an example of the contactless power transmission system 200 of the present embodiment. The contactless power transmission system 200 includes a charger 500 (electronic apparatus on the power transmitting side) and electronic apparatuses 510 and 512 (first and second electronic apparatuses, electronic apparatuses on the power receiving side). The charger 500 includes the power transmitting device 10 (primary coils L1A and L1B, control device 20, power transmitter 12). The electronic apparatuses 510 and 512 respectively include the power receiving devices 40 and 41 (secondary coils L2A and L2B, control devices 50 and 51).

The charger 500 (power transmitting device 10) is provided with a placement portion 520 (first placement portion) onto which the electronic apparatus 510 that is to be charged by the power signal from the primary coil L1A is placed and a placement portion 522 onto which the electronic apparatus 512 that is to be charged by the power signal from the primary coil L1B is placed.

Specifically, two recesses (holes, hole portions) for inserting the electronic apparatuses 510 and 512 are provided side-by-side (horizontally) in a casing of the charger 500, and the two recesses correspond to the placement portions 520 and 522. When the direction in which the electronic apparatuses 510 and 512 are inserted to the recesses is referred to as a first direction D1, the primary coils L1A and L1B are provided in walls of the recesses on a side in a second direction D2 that intersects the first direction D1. The electronic apparatuses 510 and 512 are respectively provided with the secondary coils L2A and L2B. The primary coils L1A and L1B and the secondary coils L2A and L2B are planar coils, for example. When the electronic apparatuses 510 and 512 are inserted into the respective recesses, the primary coils L1A and L1B respectively face the secondary coils L2A and L2B. That is, the axes of the primary coils L1A and L1B and the secondary coils L2A and L2B are parallel (substantially parallel) to the second direction D2.

Note that, a case where the primary coils L1A and L1B are provided in the walls of the recesses on the second direction D2 side is shown in FIG. 3, but there is no limitation thereto. That is, the primary coil L1B (L1A) needs only be placed such that the secondary coil L2B (L2A) is coupled thereto, the secondary coil L2B (L2A) ideally not coupled to the primary coil L1A (L1B) to which the secondary coil L2A (L2B) is coupled. For example, the primary coils L1A and L1B may be provided in the bottoms of the recesses of the placement portions 520 and 522, and the axes thereof may be parallel (substantially parallel) to the first direction D1.

In the contactless power transmission system 200 described above, the placement portions 520 and 522 of the charger 500 are desirably separated from each other from the viewpoint of suppressing unnecessary coupling between coils. However, in many cases, the placement portions 520 and 522 are arranged close to each other in response to the demand of downsizing the charger 500 or the like. For example, when the electronic apparatuses 510 and 512 are small apparatuses such as a hearing aid and a wireless headphone (wireless earphone), the placement portions 520 and 522 are envisioned to be very close to each other. In these cases, the primary coil L1B and the secondary coil L2A (or the primary coil L1A and the secondary coil L2B) are very close to each other, and therefore the power transmission is likely to suffer from interference.

That is, when the charger 500 is performing normal power transmission to the electronic apparatus 510, the electronic apparatus 510 is in a state of being inserted into the placement portion 520. Therefore, the magnetic field generated by the primary coil L1B will may cause the secondary coil L2A to generate electromotive force that affects the voltage generated in the power receiving device 40 of the electronic apparatus 510. Also, when the charger 500 is performing intermittent power transmission to the electronic apparatus 512, the voltage generated in the power receiving device 40 of the electronic apparatus 510 may change between the period during which the drive signal DSB is supplied to the primary coil L1B and the period during which the drive signal DSB is not supplied to the primary coil L1B. When the voltage generated in the power receiving device 40 changes, the power receiving device 40 or the electronic apparatus 510 may be affected.

Also, as described in FIG. 2, the power transmitting device 10 receives communication data transmitted from the power receiving devices 40 and 41 using load modulation by detecting currents that flow from the power supply to the power transmission drivers 18 and 19. When the power transmission driver 19 is performing intermittent power transmission to the power receiving device 41, the power transmission driver 19 intermittently turns on. When the state of the power transmission driver 19 changes from off to on or on to off, a rush current flows to the power transmission driver 19 from the power supply. That is, the current IinA flowing to the power supply voltage controller 15 from the power supply rapidly changes. Then, this rush current (change in the power supply voltage caused by a rush current, for example) may affect the detection of a current in the communication using load modulation, and cause a communication error to occur.

Figure 10:
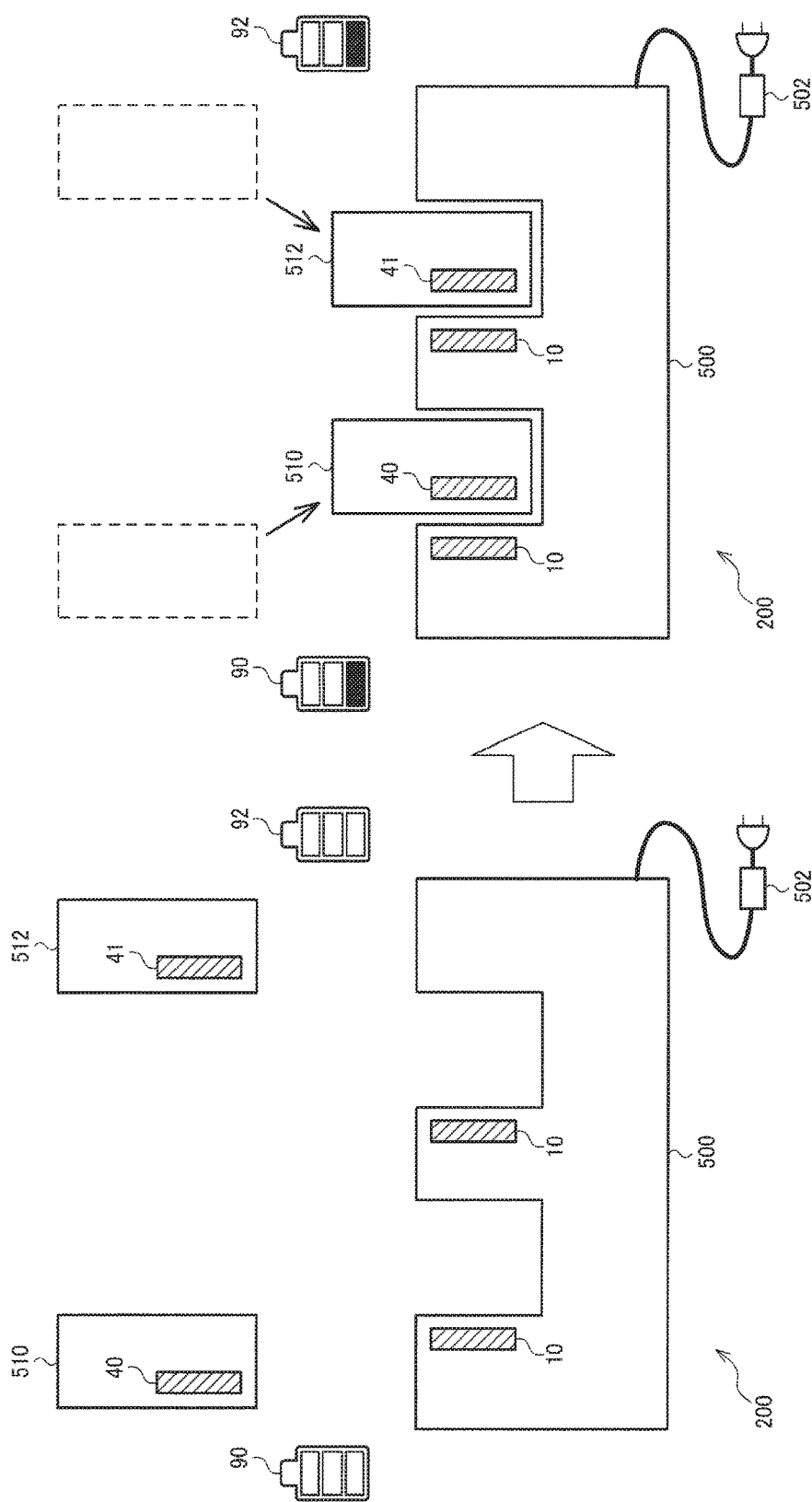
FIG. 10 shows an example of a contactless power transmission system of the present embodiment.

Specifically, the power transmission drivers 18 and 19 (power supply voltage controllers 14 and 15) operate with a common power supply (power supply device such as the power supply adapter 502 in FIG. 10, for example). Therefore, the rush current (rapid change in current IinA) due to intermittent power transmission may affect, via the common power supply, the current ID1 that flows to the communication unit 30, and cause an error in the reception of communication data by the communication unit 30. A USB power supply or the like is envisioned as the common power supply. In many cases, the USB power supply has a relatively small maximum output, and is susceptible to a rapid change in current (the current value of ID1 deviates from the current value that is envisioned to flow, for example).

Figure 4:
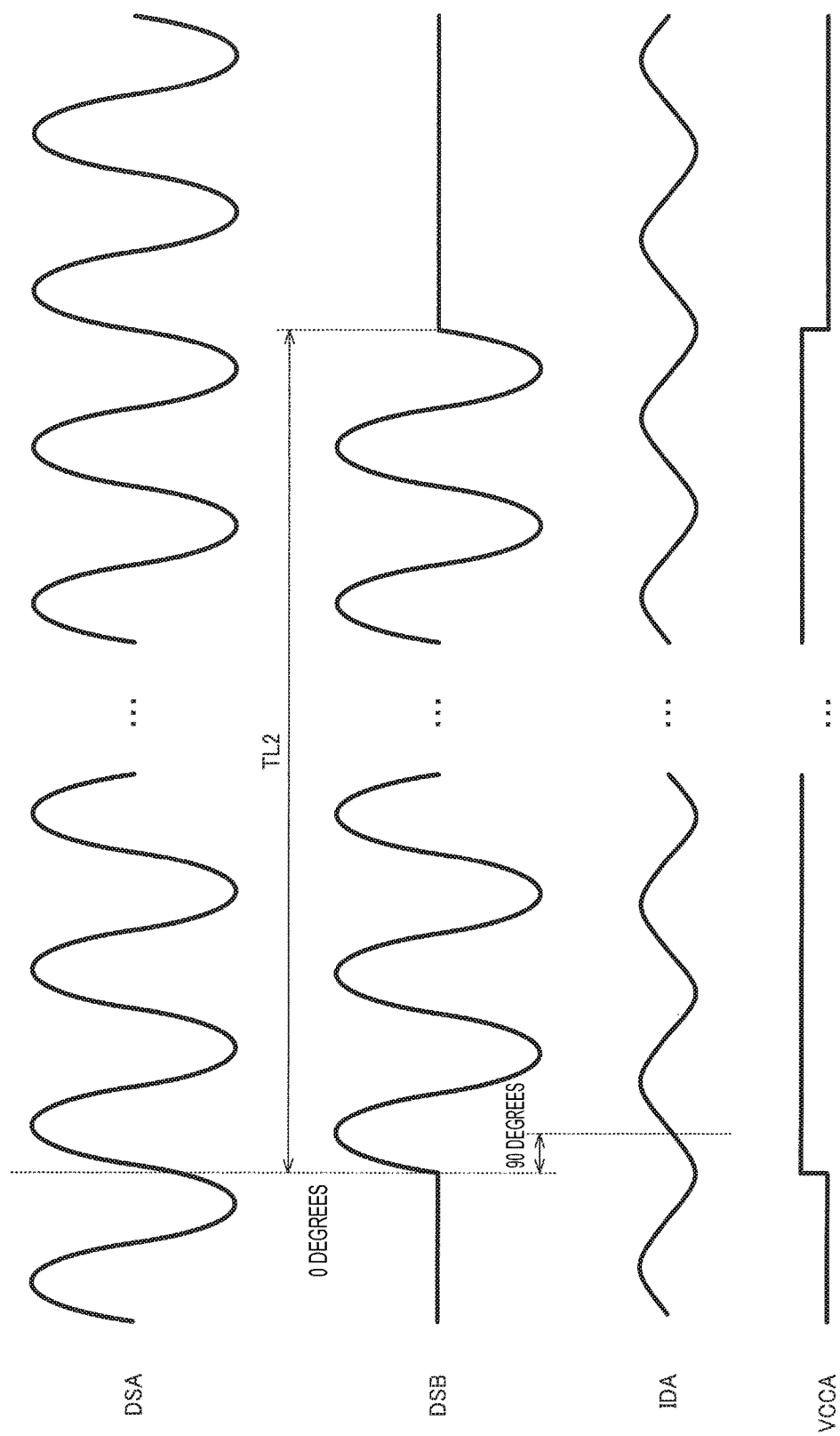
FIG. 4 shows exemplary signal waveforms in the case where the phase difference between first and second drive signals that respectively drive first and second primary coils is 0 degrees.

FIG. 4 shows exemplary signal waveforms in the case where the phase difference of the drive signals DSA and DSB that drive the primary coils L1A and L1B is 0 degrees.

The period TL2 is a period during which power is transmitted by intermittent power transmission, and the power transmission driver 19 is turned on in this period TL2 (drive signal DSB is supplied to the primary coil L1B). Since the phase difference of the drive signals DSA and DSB is 0 degrees, the phase difference of the electromotive forces generated in the secondary coil L2A by the respective drive signals DSA and DSB is 0 degrees, and therefore the resultant electromotive force is intensified. As a result, the rectified voltage VCCA that is generated by rectifying the signal received by the secondary coil L2A has a voltage that is higher in the period TL2 than in a period other than the period TL2.

The current IDA is a current that flows to the primary coil L1A by the drive signal DSA, as shown in FIG. 2. The phase of the current IDA shifts (is delayed) relative to the phase of the drive signal DSA by 90 degrees. Therefore, the phase of the current IDA shifts by approximately 90 degrees relative to the timing (start and end timings of the period TL2) at which a rush current flows to the power supply due to intermittent power transmission. In this case, the influence on the current detection in communication is small, and the possibility that a communication error will occur is low. For example, when the current that flows to the communication unit 30 from the power supply is denoted as ID1 as shown in FIG. 2, the current ID1 increases when the phase of the current IDA is in the vicinity of 0 degrees. This is because a large current is needed to charge the primary coil L1A. Therefore, the current ID1 flows at a timing shifted from the timing at which a rush current flows by 90 degrees, and a communication error is unlikely to occur in the communication unit 30 that detects the current ID1 (average thereof).

Figure 5:
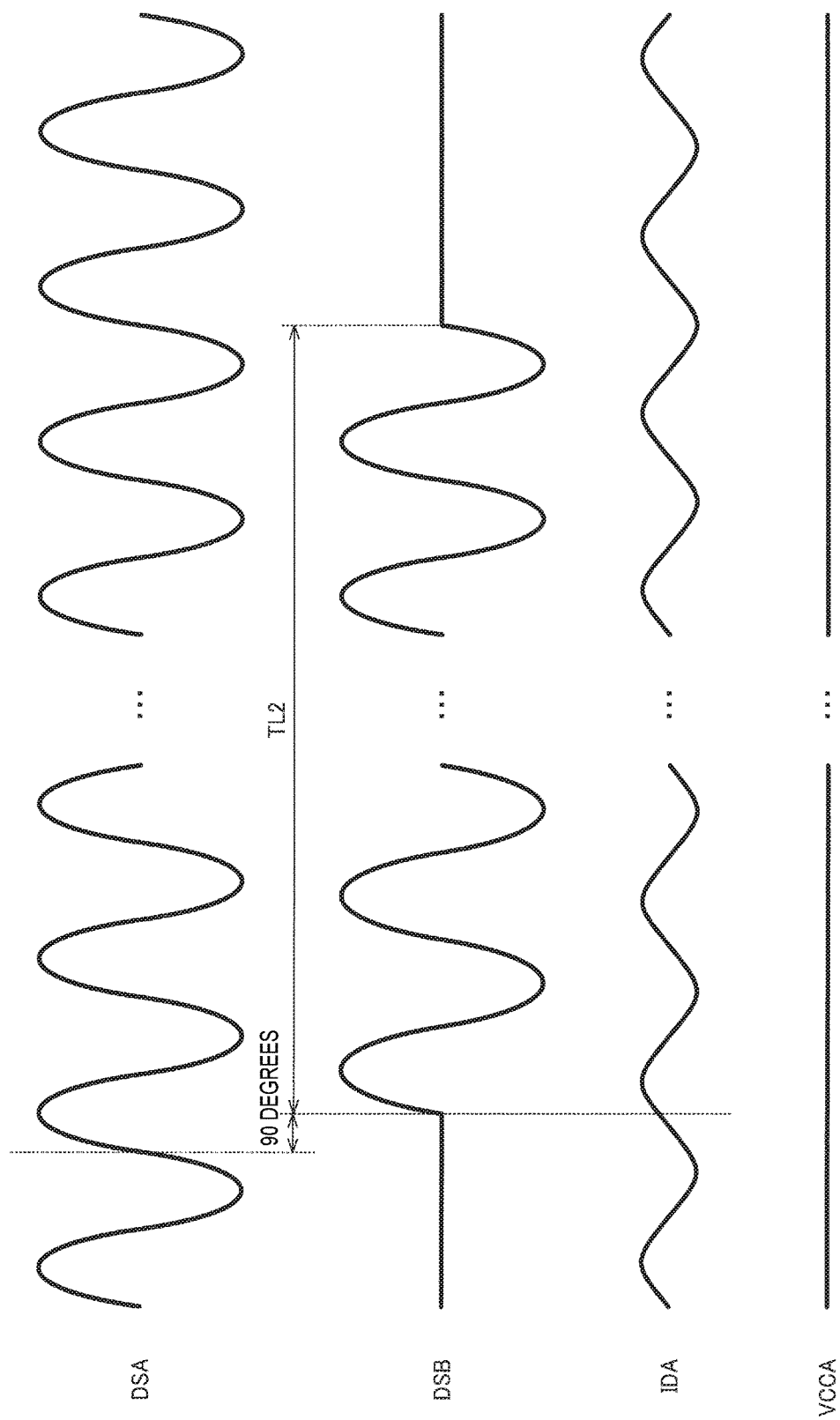
FIG. 5 shows exemplary signal waveforms in the case where the phase difference between the first and second drive signals that respectively drive the first and second primary coils is 90 degrees.

FIG. 5 shows exemplary signal waveforms in the case where the phase difference of the drive signals DSA and DSB that drive the primary coils L1A and L1B is 90 degrees.

Since the phase difference of the drive signals DSA and DSB is 90 degrees, the phase difference between the electromotive forces generated in the secondary coil L2A respectively by the drive signals DSA and DSB is also 90 degrees. Therefore, when the signal received by the secondary coil L2A is rectified, the signal of the electromotive force generated in the secondary coil L2A by the drive signal DSB is removed (becomes zero due to full wave rectification). The rectified voltage VCCA has a voltage that is the same (approximately the same) in a period other than the period TL2 and in the period TL2.

The phase of the current IDA that flows through the primary coil L1A is approximately 0 degrees relative to the timing (start and end timing of the period TL2) at which a rush current flows to the power supply due to intermittent power transmission. In this case, the influence on the current detection in communication increases, and a communication error may occur. That is, because the timing at which the current ID1 that flows to the communication unit 30 from the power supply increases (phase of the IDA is in the vicinity of 0 degrees) and the timing at which a rush current flows match (substantially match), a communication error is likely to occur in the communication unit 30 that detects the current ID1 (average thereof).

Figure 6:
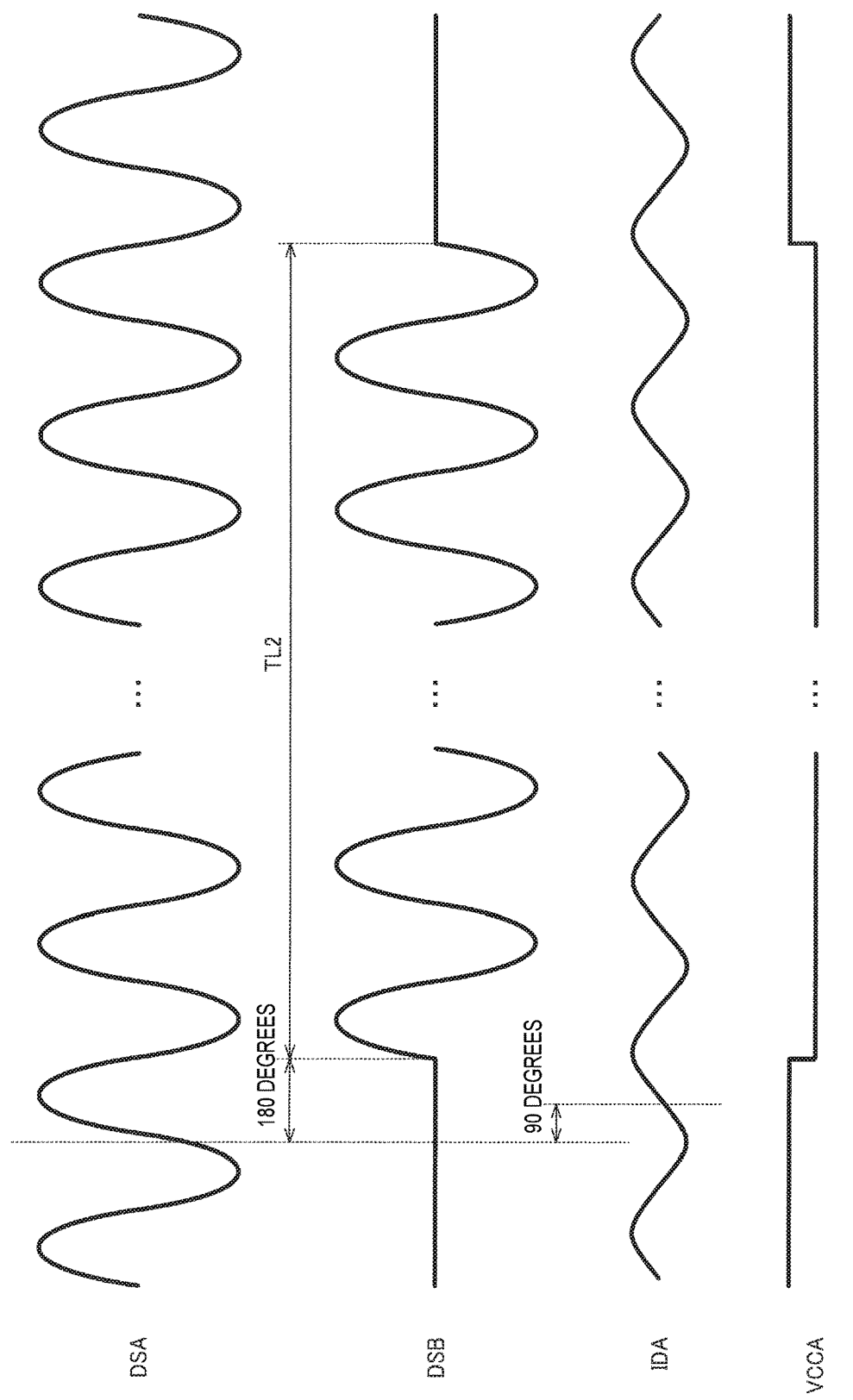
FIG. 6 shows exemplary signal waveforms in the case where the phase difference between the first and second drive signals that respectively drive the first and second primary coils is 180 degrees.

FIG. 6 shows exemplary signal waveforms in the case where the phase difference of the drive signals DSA and DSB that drive the primary coils L1A and L1B is 180 degrees.

Since the phase difference of the drive signals DSA and DSB is 180 degrees, the phase difference of the electromotive forces generated in the secondary coil L2A by the drive signals DSA and DSB is also 180 degrees, and therefore the resultant electromotive force is weakened. As a result, the rectified voltage VCCA that is generated by rectifying the signal received by the secondary coil L2A has a voltage that is lower in the period TL2 than in a period other than the period TL2. In this case, the operations of the power receiving device 40 and the electronic apparatus 510 may be adversely affected. For example, as indicated by B9 in FIG. 15, when the rectified voltage VCCA is larger than a predetermined voltage, a battery is charged. In this case, it is possible that, when the rectified voltage VCCA decreases due to the influence of intermittent power transmission, the rectified voltage VCCA will decrease below the predetermined voltage, and charging of the battery will stop. Alternatively, as indicated by C4 in FIG. 16, when the rectified voltage VCCA decreases below the predetermined voltage (3.1 V) in normal power transmission, the power receiving device 40 is judged to have been removed. In this case, when the rectified voltage VCCA decreases due to the influence of intermittent power transmission, the rectified voltage VCCA may decrease below the predetermined voltage (3.1 V), and removal may be erroneously detected. It is possible that the load modulation will stop, or the operation mode will be erroneously shifted to landing detection, for example.

The phase of the current IDA that flows through the primary coil L1A is approximately 90 degrees relative to the timing (start and end timing of the period TL2) at which a rush current flows to the power supply due to intermittent power transmission. In this case, similarly to FIG. 4, a communication error is unlikely to occur in the communication unit 30.

In the case where the phase difference between the drive signals DSA and DSB is not controlled in any way, the phase difference between the drive signals DSA and DSB takes a random value (any phase difference). That is, the landing of the electronic apparatuses 510 and 512 to the charger 500 and the removal of the electronic apparatuses 510 and 512 from the charger 500 are performed by a user at an arbitrary timing. Also, the timing at which the battery is fully charged differs based on the remaining quantity at the start of charging and the charging status. Therefore, the transition between the states of landing detection, normal power transmission, removal detection, and the like occurs at independent timings between the electronic apparatuses 510 and 512, and accordingly, the phase difference between the drive signals DSA and DSB takes a random value.

For example, when the phase difference between the drive signals DSA and DSB is in the vicinity of 90 degrees, the communication using load modulation may be adversely affected, as described in FIG. 5. Also, when the phase difference between the drive signals DSA and DSB is in the vicinity of 180 degrees, the power transmission by normal power transmission may be affected, and the operations of the power receiving device 40 and the electronic apparatus 510 may be adversely affected.

In this regard, according to the present embodiment, when normal power transmission is performed by the power transmission driver 18 and intermittent power transmission is performed by the power transmission driver 19, as a result of setting the phase difference between the drive signals DSA and DSB to a predetermined phase difference, the phase difference with which the malfunction described above may occur can be avoided. That is, the phase differences other than the phase difference in the vicinity of 90 degrees and the phase difference in the vicinity of 180 degrees are set as predetermined phase differences. For example, the predetermined phase differences are the phase differences in a range from 0 degrees to 60 degrees and in a range from 120 degrees to 150 degrees. Alternatively, the predetermined phase differences may be phase differences in a range from 0 degrees to 45 degrees, or may be phase differences in a range from 0 degrees to 30 degrees.

Also, the predetermined phase differences may be 0 degrees. Note that "the predetermined phase differences may be 0 degrees" includes not only the case where the predetermined phase difference is 0 degrees, but also the case where the predetermined phase difference is in the vicinity of 0 degrees (in a certain degree of range including 0 degrees). The predetermined phase difference may be in a range approximately from 0 degrees to 10 degrees.

When normal power transmission is performed by the power transmission driver 18 and intermittent power transmission is performed by the power transmission driver 19, as a result of setting the phase difference between the drive signals DSA and DSB to 0 degrees, the influence of the intermittent power transmission on the communication in the normal power transmission can be reduced, as described in FIG. 4. Also, the rectified voltage VCCA in normal power transmission increases in the period TL2 during which power is transmitted in intermittent power transmission. As describe in FIG. 6, the power receiving device 40 or the like may be adversely affected when the rectified voltage VCCA decreases, but the possibility of malfunction occurring decreases when the rectified voltage VCCA increases (at least the malfunction described in FIG. 6 is unlikely to occur).

Figure 11:
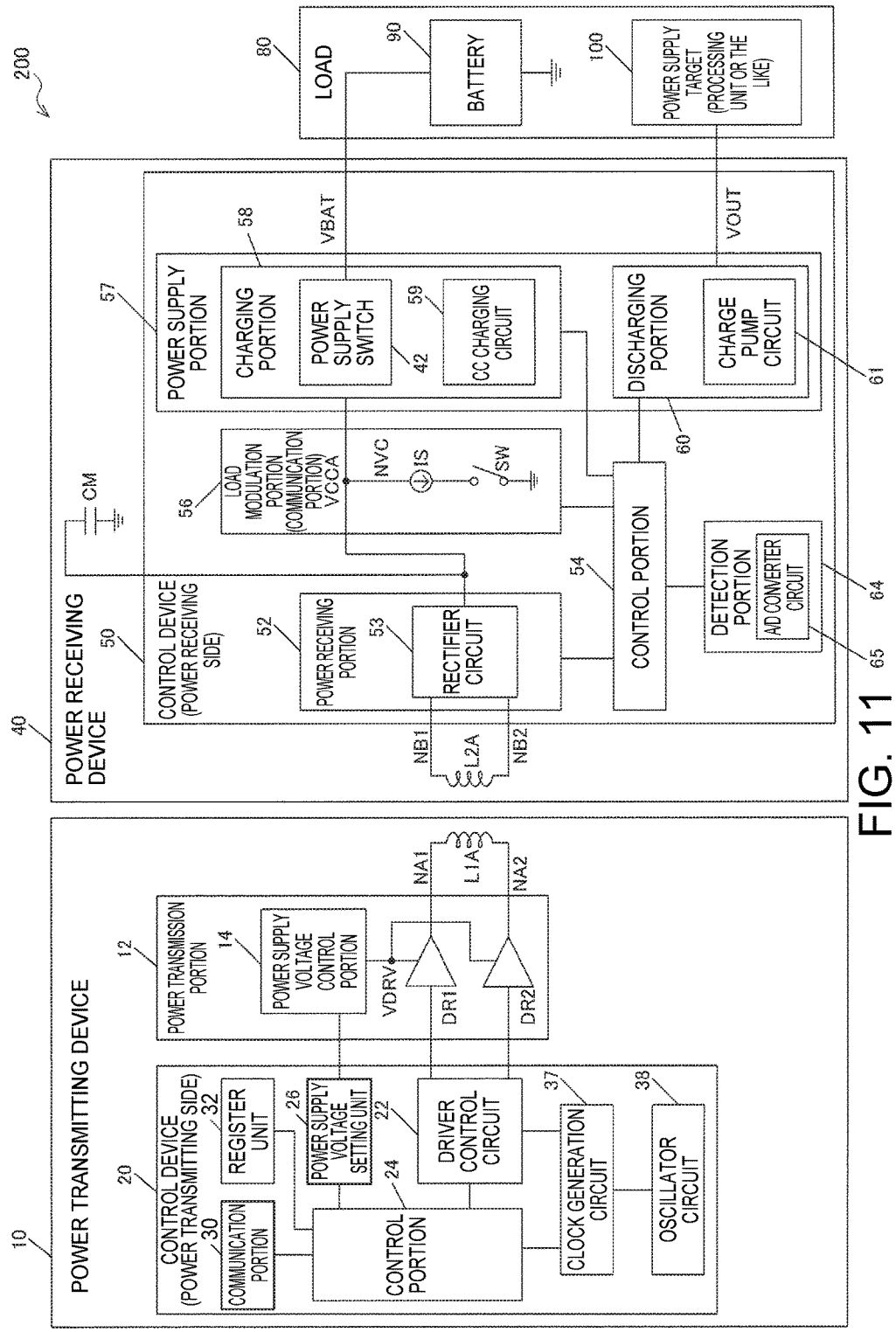
FIG. 11 shows a detailed exemplary configuration of control devices on a power transmitting side and a power receiving side, and a power transmitting device and a power receiving device including the same.

Note that the phase difference between the drive signals DSA and DSB can be controlled in the following way, for example. That is, the controller 24 can include a signal generation unit 27 (driver controller) that supplies rectangular wave signals to the power transmission drivers 18 and 19, respectively, as shown in FIG. 2. The signal generation unit 27 generates a rectangular wave signal by frequency-dividing a drive clock signal from an oscillator or the like. Then, the power transmission drivers 18 and 19 respectively output the drive signals DSA and DSB by buffering the rectangular wave signals. The controller 24 can include a phase difference controller 28 that controls the phase difference between the rectangular wave signals that are respectively supplied to the power transmission drivers 18 and 19. The phase difference controller 28 sets the phase difference between the rectangular wave signals by controlling the signal generation unit 27, and thereby sets the phase difference between the drive signals DSA and DSB. For example, the phase difference controller 28 controls the phase difference between the drive signals DSA and DSB by controlling the start timing (reset timing of frequency divider) of the frequency division by the signal generation unit 27. Note that the signal generation unit 27 may not be included in the controller 24. In FIG. 11 described later, the driver control circuit 22 may include the function of the signal generation unit 27, for example.

Also, in the present embodiment, the controller 24 variably sets the phase difference between the drive signal DSA and the drive signal DSB. That is, the phase difference between the drive signals DSA and DSB is not fixed to the predetermined phase difference described above, and can be set to a phase difference other than the predetermined phase difference. For example, setting information for the phase difference is set to a register of the power transmitting device 10 from the outside of the power transmitting device 10 (processing device such as CPU, for example), and the phase difference between the drive signals DSA and DSB is variably set according to the setting information. Alternatively, the control device 20 may automatically variably set the phase difference between the drive signals DSA and DSB according to the status control thereof (according to a flag or the like that indicates the status, for example).

In this way, an appropriate phase difference between the drive signals DSA and DSB can be set according to the control status or the operation mode of the contactless power transmission system 200, for example. For example, in the case where a communication error may occur, a phase difference with which the communication error can be suppressed can be set, and in the case where power transmission (rectification voltage) may be affected, a phase difference with which the influence on power transmission can be suppressed can be set.

Also, in the present embodiment, the controller 24 variably sets the phase difference according to the power transmission modes of the power transmission driver 18 and the power transmission driver 19. For example, the phase difference is changed according to the respective power transmission modes being either of the normal power transmission mode and intermittent power transmission mode. Note that the setting of the phase difference is not limited to setting the phase difference to the predetermined phase difference according to the combination of modes of the power transmission drivers 18 and 19, and includes a case where the phase difference is not set in some combinations of modes (determined randomly), for example.

In this way, an appropriate phase difference between the drive signals DSA and DSB can be set according to the power transmission modes of the power transmission drivers. That is, an appropriate phase difference between the drive signals DSA and DSB can be set in the case where one of the power transmission drivers 18 and 19 is in the normal power transmission mode and the other is in the intermittent power transmission mode, and can be set according to the combination of various power transmission modes as well.

Also, in the present embodiment, the controller 24 variably sets the phase difference between the drive signals DSA and DSB such that the phase difference between the drive signals DSA and DSB is one of at least two of 0 degrees, 90 degrees, and 180 degrees. That is, the phase difference is set to one of two of 0 degrees, 90 degrees, and 180 degrees or one of 0 degrees, 90 degrees, and 180 degrees. For example, the phase difference is set to one of the aforementioned at least two phase differences according to the power transmission modes of the power transmission drivers. For example, the phase difference is set to each of the cases, namely a case where the two power transmission drivers perform the normal power transmission, a case where the two power transmission drivers perform the intermittent power transmission, and a case where one of the two power transmission drivers performs the normal power transmission and the other transmission driver performs the intermittent power transmission. Note that "setting the phase difference to 0 degrees, 90 degrees, or 180 degrees" includes not only a case where the phase difference is 0 degrees, 90 degrees, or 180 degrees, but also a case where the phase difference is set to a region in the vicinity of 0 degrees, 90 degrees, or 180 degrees (in a certain range including 0 degrees, 90 degrees, or 180 degrees). For example, the phase difference may be set in a range approximately from 0 degrees to 10 degrees, in a range approximately from 80 degrees to 100 degrees, or in a range approximately from 170 degrees to 180 degrees.

In this way, according to the control status or the operation mode of the contactless power transmission system 200, for example, an appropriate phase difference between the drive signals DSA and DSB can be set from 0 degrees, 90 degrees, and 180 degrees. For example, in the case where a communication error may occur, the phase difference can be set to 0 degrees or 180 degrees with which the occurrence of a communication error can be suppressed, and in the case where power transmission (rectification voltage) may be affected, the phase difference can be set to 90 degrees with which the influence on power transmission can be suppressed.

Also, in the present embodiment, the controller 24 changes the phase difference between the drive signals DSA and DSB when normal power transmission is performed by the power transmission driver 18 and intermittent power transmission is performed by the power transmission driver 19 from the phase difference between the drive signals DSA and DSB when normal power transmission is performed by the power transmission driver 18 and the power transmission driver 19.

When normal power transmission is performed by the power transmission drivers 18 and 19, interference to the communication due to intermittent power transmission does not occur. According to the present embodiment, when normal power transmission is performed by the power transmission drivers 18 and 19, the phase difference with which the influence to the power transmission can be reduced can be set regardless of whether or not the occurrence of communication error is to be reduced.

Also, in the present embodiment, controller 24 sets the phase difference between the drive signals DSA and DSB to 0 degrees when normal power transmission is performed by the power transmission driver 18 and intermittent power transmission is performed by the power transmission driver 19. On the other hand, the phase difference between the drive signals DSA and DSB is set to 90 degrees when normal power transmission is performed by the power transmission driver 18 and the power transmission driver 19.

In this way, when normal power transmission is performed by the power transmission driver 18 and intermittent power transmission is performed by the power transmission driver 19, the occurrence of a communication error due to the influence of intermittent power transmission can be suppressed. Also, when normal power transmission is performed by the power transmission driver 18 and the power transmission driver 19, the change in rectification voltage due to interference between power transmissions can be suppressed, and the adverse influence on the power receiving devices 40 and 41 or the electronic apparatuses 510 and 512 can be suppressed.

3. Communication Method

Figure 7:
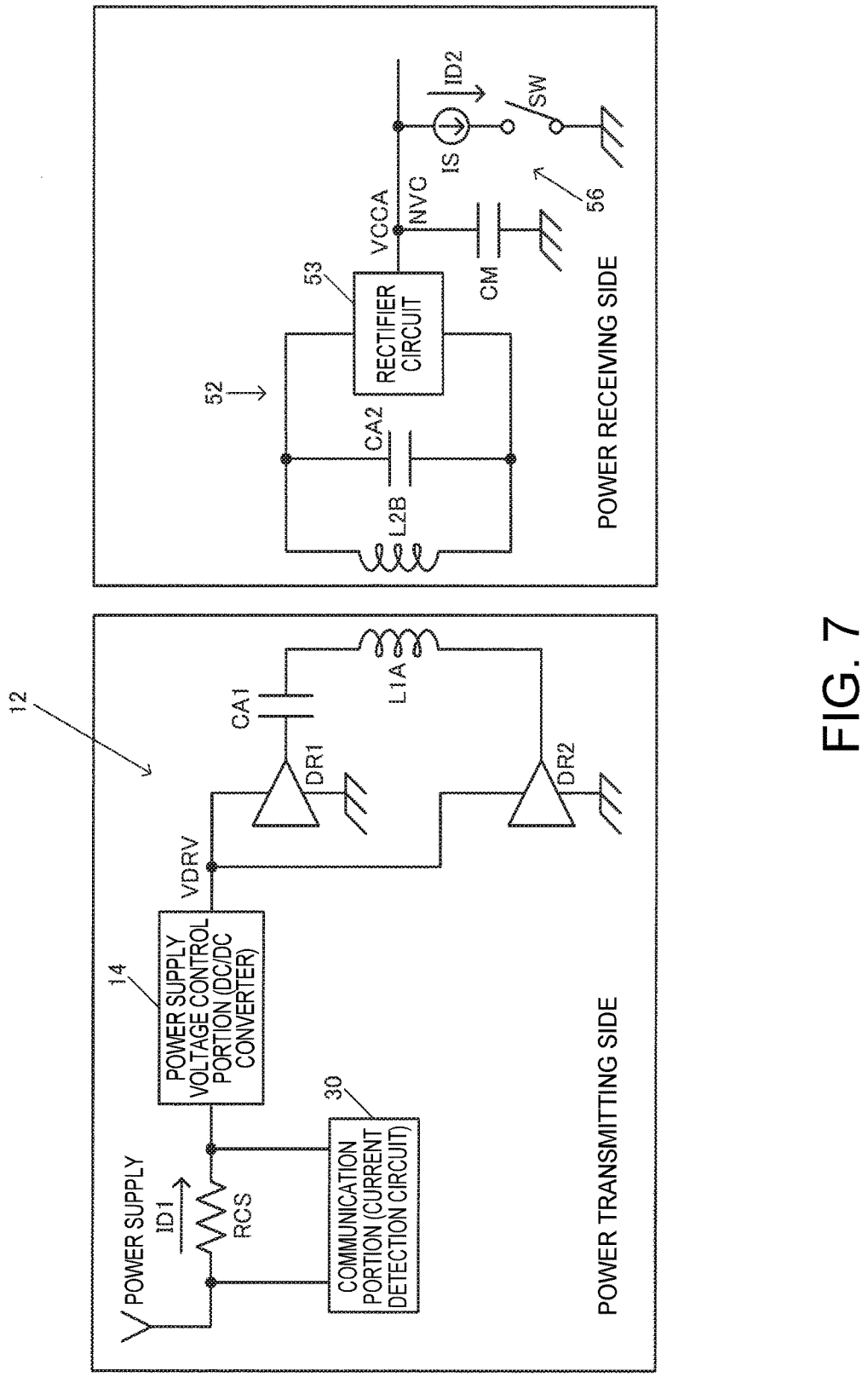
FIG. 7 is a diagram for illustrating a communication method using load modulation.

FIG. 7 is a diagram for illustrating a communication method by load modulation. Note that, in the following, the communication between the power transmitting device 10 and the power receiving device 40 will be described as an example, but the communication between the power transmitting device 10 and the power receiving device 41 can be realized with a similar method.

The power transmission drivers DR1 and DR2 drive the primary coil L1A on the power transmitting side based on the drive voltage VDRV (power supply voltage) supplied from the power supply voltage controller 14, as shown in FIG. 7.

Meanwhile, on the power receiving side (secondary side), the coil end voltage of the secondary coil L2A is rectified by the rectifier circuit 53 in the power receiving unit 52, and a rectified voltage VCCA is output to the node NVC. Note that the primary coil L1A and a capacitor CA1 constitute a resonance circuit on the power transmitting side, and the secondary coil L2A and a capacitor CA2 constitute a resonance circuit on the power receiving side.

On the power receiving side, a current ID2 of the current source IS is caused to intermittently flow from the node NVC to the GND side by turning on and off the switching element SW in a load modulation unit 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 10, for example) on the power transmitting side and the power supply voltage controller 14. A power supply voltage is supplied from the power supply to the power supply voltage controller 14 via the sense resistor RCS. A current ID1 that flows from the power supply to the sense resistor RCS changes due to the change of the load state on the power receiving side caused by load modulation, and the communication unit 30 detects the change in the current. Then, the communication unit 30 performs a detection operation for detecting communication data that is transmitted by load modulation based on the detection result.

Figure 8:
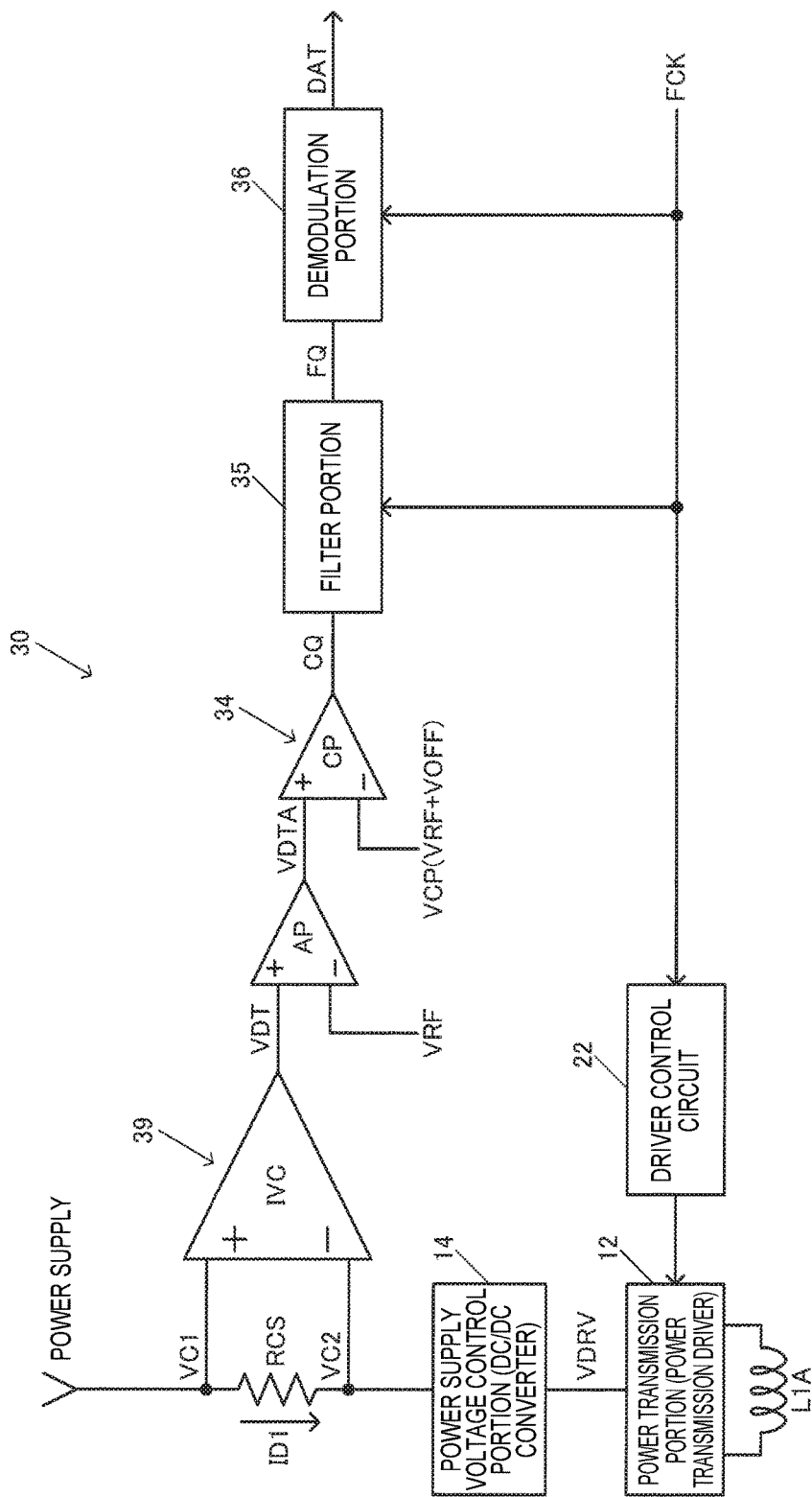
FIG. 8 shows an example of a specific configuration of a communication unit.

FIG. 8 shows an example of a specific configuration of the communication unit 30. The communication unit 30 includes a current detection circuit 39, a comparator circuit 34, and a demodulation unit 36. Also, the communication unit 30 can include an amplifier AP for signal amplification and a filter unit 35. Note that the communication unit 33 can be similarly configured.

The current detection circuit 39 detects the current ID1 that flows from the power supply (power supply device) to the power transmitter 12 via the power supply voltage controller 14. The current ID1 may include a current that flows through the driver control circuit 22 and the like, for example. The current detection circuit 39 is constituted by an IV conversion amplifier IVC. The IV conversion amplifier IVC amplifies a minute voltage VC1-VC2 that is generated by the minute current ID1 that flows in the sense resistor RCS, and outputs the amplified voltage as the detection voltage VDT. The amplifier AP outputs a signal of detection voltage VDTA that is a result of amplifying the detection voltage VDT using the reference voltage VRF as a reference, to the comparator circuit 34.

A comparator circuit 34 compares the detection voltage VDTA generated by the current detection circuit 39 with a judgement voltage VCP=VRF+VOFF, and outputs a comparison result CQ. The comparator circuit 34 can be constituted by a comparator CP. In this case, the voltage VOFF in the judgement voltage VCP=VRF+VOFF can be realized by an offset voltage of the comparator CP or the like, for example.

The demodulation unit 36 detects communication data by performing processing of demodulating the load modulation pattern based on the comparison result CQ (comparison result FQ after filtering processing) of the comparator circuit 34, and outputs the communication data as a detection data DAT. The filter unit 35 is provided between the comparator circuit 34 and the demodulation unit 36, and the demodulation unit 36 performs processing of demodulating the load modulation pattern based on the comparison result FQ after filtering processing by the filter unit 35.

The filter unit 35 and the demodulation unit 36 operate by receiving a drive clock signal FCK (from a clock generation circuit 37 in FIG. 11), for example. The drive clock signal FCK is a signal for defining a power transmission frequency, and the driver control circuit (driver control circuit 22 in FIG. 11) drives the power transmission drivers DR1 and DR2 in the power transmitter 12 by receiving the drive clock signal FCK.

4. Power Supply Voltage Controller

Figure 9:
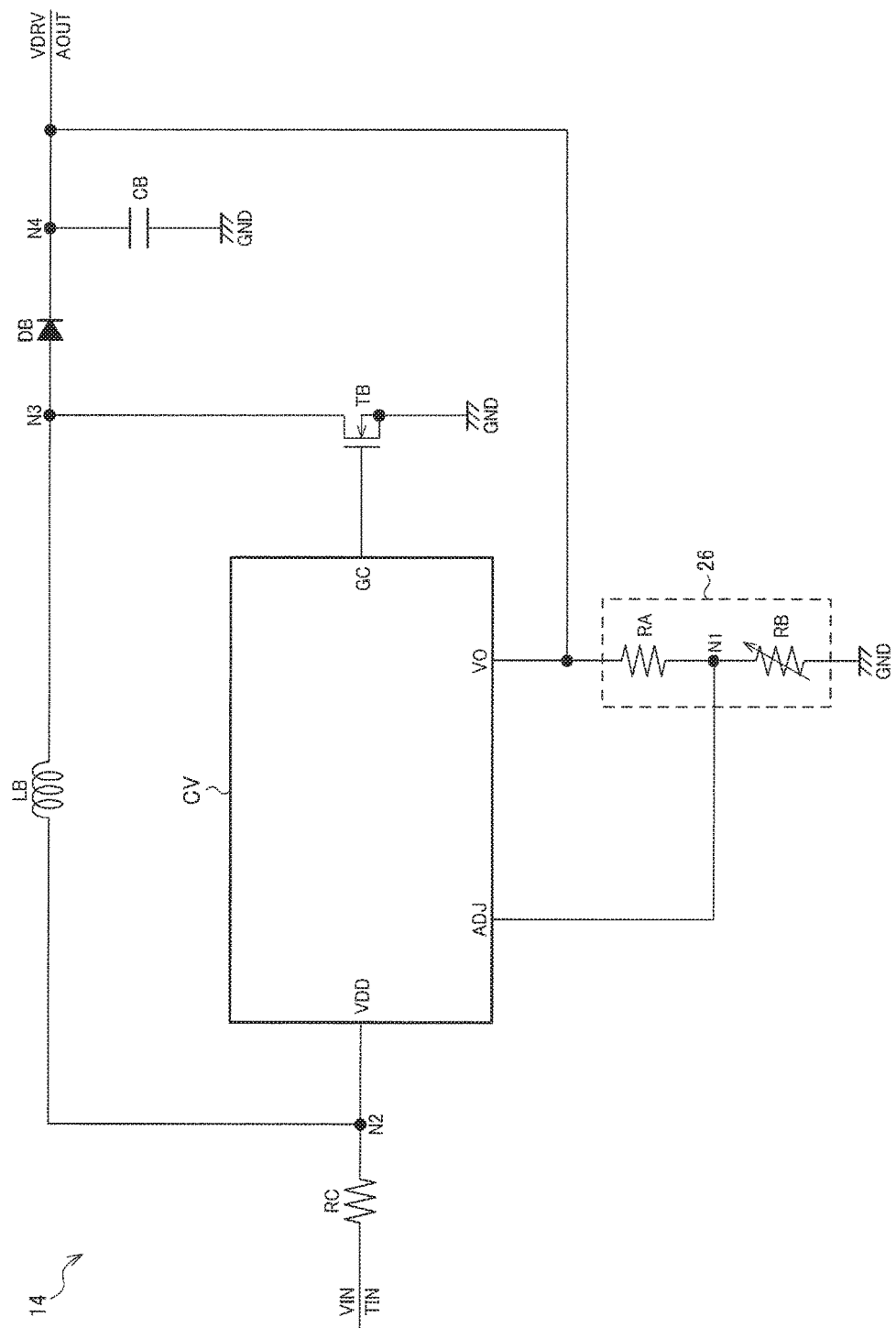
FIG. 9 shows a detailed exemplary configuration of a power supply voltage controller.

FIG. 9 shows a detailed exemplary configuration of the power supply voltage controller 14. The power supply voltage controller 14 includes a resistor RC, an inductor LB (coil), a diode DB, a capacitor CB, a control circuit CV (switching control circuit), and a transistor TB (N-type MOS transistor, for example). A resistor RA and a variable resistor RB are incorporated in the control device 20 as a power supply voltage setting unit 26, for example. Note that the power supply voltage controller 15 can be similarly configured.

The power supply voltage setting unit 26 is a resistive divider circuit, and includes the resistor RA and the variable resistor RB. The resistor RA is provided between a node AOUT from which the drive voltage VDRV (output voltage) for the power transmission driver 18 is output and a node N1. The variable resistor RB is provided between the node N1 and the ground GND (low voltage side power supply, in a broad sense). The resistance value of the variable resistor RB is set by the controller 24.

The resistor RC in the power supply voltage controller 14 is provided between a node TIN to which a power supply voltage VIN (input voltage) is supplied and a node N2. The inductor LB is provided between the node N2 and a node N3. The diode DB has an anode connected to the node N3 and a cathode connected to a node N4. The capacitor CB is provided between the node N4 and the ground GND. The control circuit CV includes a terminal VDD connected to the node N2, a terminal ADJ connected to the node N1, a terminal VO connected to the node AOUT, and a terminal GC connected to a gate of the transistor TB. The transistor TB has a drain connected to the node N3 and a source connected to the ground GND.

In the circuit as shown in FIG. 9, the drive voltage VDRV (power supply voltage) can be represented by the following equation (1). Note that, in the following equation (1), $V_{ADJ}$ is a voltage at the terminal ADJ of the control circuit CV, $R_{RA}$ is a resistance value of the resistor RA, and $R_{RB}$ is a resistance value of the variable resistor RB.

$$VDRV = V_{ADJ} \times (R_{RA} + R_{RB})/R_{RB} \quad (1)$$

Specifically, the power supply voltage controller 14 functions to keep the voltage $V_{ADJ}$ at the terminal ADJ at a constant value. That is, the control circuit CV performs modulation control (PWM: Pulse Width Modulation, for example) on an on/off signal of the transistor TB such that the voltage $V_{ADJ}$ at the terminal ADJ is a reference voltage $V_{ref}$ (constant value), and outputs the on/off signal from the terminal GC to the gate of the transistor TB. The voltage $V_{ADJ}$ generated by resistively dividing the drive voltage VDRV is controlled to be a constant value, and as a result, the drive voltage VDRV is controlled to be a constant value. Also, the dividing ratio according to the resistor RA and the variable resistor RB changes as a result of the resistance value of the variable resistor RB being changed, and therefore the drive voltage VDRV can be variably controlled.

The control circuit CV can be realized by a triangular wave generation circuit, an error amplification amplifier, and a PWM signal output circuit, for example. That is, the triangular wave generation circuit generates a triangular wave, and the error amplification amplifier amplifies the error between the voltage $V_{ADJ}$ and the reference voltage $V_{ref}$. The PWM signal output circuit outputs a PWM signal (on/off signal) by comparing the triangular wave generated by the triangular wave generation circuit and an output of the error amplification amplifier.

5. Contactless Power Transmission System

Hereinafter, the control device 20 and the electronic apparatus including the control device 20 will be described in detail taking a case where the control device 20 of the present embodiment is applied to the power transmitting device 10 of the contactless power transmission system 200 as an example.

FIG. 10 shows an example of the contactless power transmission system 200 of the present embodiment. A charger 500 (one of electronic apparatuses) includes a power transmitting device 10. The electronic apparatuses 510 and 512 respectively includes the power receiving devices 40 and 41. Also, the electronic apparatuses 510 and 512 respectively include batteries 90 and 92. Note that, although the batteries 90 and 92 are schematically illustrated in FIG. 10, the batteries 90 and 92 are, in actuality, respectively incorporated in the electronic apparatuses 510 and 512. The contactless power transmission system 200 of the present embodiment is constituted by the power transmitting device 10 and the power receiving devices 40 and 41 in FIG. 10.

Power is supplied to the charger 500 via a power supply adapter 502, and this power is transmitted by contactless power transmission from the power transmitting device 10 to the power receiving devices 40 and 41. Accordingly, the batteries 90 and 92 in the electronic apparatuses 510 and 512 can be charged and allow devices in the electronic apparatuses 510 and 512 to operate.

Note that a power supply of the charger 500 may be a power supply using a USB (USB cable). Also, various apparatuses can be envisioned as the electronic apparatuses 510 and 512 to which the present embodiment is applied. For example, various electronic apparatuses can be envisioned such as a hearing aid, a wireless headphone, a watch (including a smart watch), a biological information measuring device (wearable apparatus for measuring a pulse wave or the like), a mobile information terminal (such as a smartphone or a cellular phone), a cordless telephone, a shaver, an electric toothbrush, a wrist computer, a handy terminal, an onboard apparatus, a hybrid car, an electric car, an electric motorcycle, and an electric bicycle. The combination of the electronic apparatuses 510 and 512 may be electronic apparatuses of the same type or electronic apparatuses of different types. For example, the electronic apparatuses 510 and 512 are hearing aids for right and left ears. Alternatively, the electronic apparatuses 510 and 512 are wireless headphones for right and left ears. Alternatively, one of the electronic apparatuses 510 and 512 is a watch or a measurement device for biological information, and the other is a mobile information terminal. For example, a control device (such as a power receiving device) of the present embodiment can be incorporated into various moving bodies such as a car, an airplane, a motorcycle, a bicycle, and a marine vessel. The moving bodies are apparatuses and devices that include drive mechanisms such as a motor and an engine, steering mechanisms such as a steering wheel and a rudder, and various electronic apparatuses (onboard apparatuses), and travel on the ground, through the air, and on the sea, for example.

Power transmission from the power transmitting device 10 to the power receiving devices 40 and 41 is realized as a result of forming a power transmission transformer by electromagnetically coupling a primary coil L1 (corresponding to L1A and L1B) provided on a power transmitting side and a secondary coil L2 (corresponding to L2A and L2B) provided on a power receiving side, or the like. Accordingly, contactless power transmission is made possible. Note that various methods such as an electromagnetic induction method and a magnetic field resonance method can be adopted as the contactless power transmission method.

6. Detailed Exemplary Configuration of Power Transmitting Device, Power Receiving Device, and Control Device FIG. 11 is a detailed exemplary configuration of the control devices 20 and 50 of the present embodiment and the power transmitting device 10 and the power receiving device 40 that respectively includes the control devices 20 and 50. Note that, in the following, the power receiving device 40 and the configuration on a power transmitting side that is related thereto will be described as an example, but the power receiving device 41 and the configuration on a power transmitting side that is related thereto can be similarly configured. Here, the configuration of the aforementioned devices is not limited to the configuration in FIG. 11, and various modifications can be implemented such as omitting a portion (reporting unit, for example) of the constituent elements, adding another constituent element, or changing a connection relationship.

The electronic apparatus on the power transmitting side such as the charger 500 in FIG. 10 includes the power transmitting device 10. Also, the electronic apparatus 510 on the power receiving side includes the power receiving device 40 and a load 80. The load 80 can include the battery 90 and a power supply target 100. According to the configuration in FIG. 11, a contactless power transmission (wireless power transfer) system is realized in which power is transmitted from the power transmitting device 10 to the power receiving device 40 by electromagnetically coupling the primary coil L1A and the secondary coil L2A.

The power transmitting device 10 (transmission module, primary module) includes the primary coil L1A, a power transmitter 12 (power transmission circuit), and the control device 20.

A power transmission transformer is formed when the primary coil L1A is electromagnetically coupled to the secondary coil L2A. For example, when power transmission is needed, the electronic apparatus 510 is placed on the charger 500 so as to be in a state in which a magnetic flux of the primary coil L1A passes through the secondary coil L2A, as shown in FIGS. 10 and 11. On the other hand, when power transmission is not needed, the electronic apparatus 510 is physically separated from the charger 500 so as to be in a state in which the magnetic flux of the primary coil L1A does not pass through the secondary coil L2A.

The power transmitter 12 includes the power transmission driver DR1 that drives one end of the primary coil L1A, the power transmission driver DR2 that drives the other end of the primary coil L1A, and the power supply voltage controller 14 (power supply voltage control circuit). Also, the power transmitter 12 can include at least one capacitor that constitutes a resonance circuit with the primary coil L1A. The power transmission drivers DR1 and DR2 can be each realized by an inverter circuit (buffer circuit) constituted by a power MOS transistor or the like, for example. These power transmission drivers DR1 and DR2 are controlled (driven) by the driver control circuit 22 of the control device 20. That is, the controller 24 controls the power transmitter 12 via the driver control circuit 22.

The power supply voltage controller 14 controls the drive voltage VDRV of the power transmission drivers DR1 and DR2. For example, the controller 24 controls the power supply voltage controller 14 based on the communication data (transmitting power setting information) received from the power receiving side. Accordingly, the drive voltage VDRV supplied to the power transmission drivers DR1 and DR2 is controlled, and variable control of the transmitting power can be realized, for example. The power supply voltage controller 14 can be realized by a DC/DC converter or the like, as described in FIG. 9. That is, the power supply voltage controller 14 performs an operation of stepping-up the power supply voltage from the power supply so as to generate the drive voltage VDRV for the power transmission drivers, and supplies the drive voltage VDRV to the power transmission drivers DR1 and DR2.

The control device 20 on the power transmitting side performs various types of control on the power transmitting side, and can be realized by an integrated circuit device (IC) or the like. The control device 20 includes the driver control circuit 22, the controller 24, the power supply voltage setting unit 26 (power supply voltage control circuit), the communication unit 30, a register unit 32, the clock generation circuit 37, and an oscillator circuit 38. Note that a modification in which the power transmitter 12 is incorporated in the control device 20 or the like can be implemented.

The driver control circuit 22 (pre-driver) controls the power transmission drivers DR1 and DR2. For example, the driver control circuit 22 outputs control signals (drive control signals) to the gates of transistors that constitutes the power transmission drivers DR1 and DR2. The power transmission drivers DR1 and DR2 apply (supply) a drive signal to the primary coil L1A based on the control signals so as to drive the primary coil L1A. The oscillator circuit 38 is constituted by a crystal-oscillator circuit or the like, and generates a clock signal on the primary side. The clock generation circuit 37 generates a drive clock signal that defines the power transmission frequency (drive frequency) or the like. The driver control circuit 22 generates a control signal having a given frequency (power transmission frequency) based on the drive clock signal and a control signal from the controller 24, and outputs the control signal to the power transmission drivers DR1 and DR2 of the power transmitter 12 for control.

The power receiving device 40 (power reception module, secondary module) includes the secondary coil L2A and the control device 50.

The control device 50 on the power receiving side performs various types of control on the power receiving side, and can be realized by an integrated circuit device (IC) or the like. The control device 50 includes the power receiving unit 52, a controller 54 (control circuit), the load modulation unit 56 (load modulation circuit), a power supply unit 57, and a detection unit 64 (detection circuit). Note that a modification in which the power receiving unit 52 is provided external to the control device 50 or the like can be implemented.

The power receiving unit 52 receives power from the power transmitting device 10. Specifically, the power receiving unit 52 includes a rectifier circuit 53 constituted by a plurality of transistors and diodes. The rectifier circuit 53 converts an AC voltage induced in the secondary coil L2A to a DC rectified voltage VCCA, and outputs the rectified voltage VCCA.

The load modulation unit 56 (communication unit, in a broad sense) performs load modulation. For example, the load modulation unit 56 includes a current source IS, and performs load modulation using the current source IS. Specifically, the load modulation unit 56 includes the current source IS (constant current source) and a switching element SW. The current source IS and the switching element SW are provided in series between a node NVC of the rectified voltage VCCA and a GND (low potential side power supply voltage, in a broad sense) node, for example. The switching element SW is turned on and off based on a control signal from the controller 54, for example, and the current (constant current) of the current source IS that flows from the node NVC to GND is caused to flow or is cut off, and thus the load modulation is realized. The switching element SW can be realized by a MOS transistor or the like. Note that the load modulation unit 56 is not limited to the configuration in FIG. 11, and various modifications such as using a resistor in place of the current source IS can be implemented.

Note that the communication method used by the power receiving device 40 is not limited to load modulation. For example, the power receiving device 40 may perform communication using the primary coil L1A and the secondary coil L2A using a method other than load modulation. Alternatively, a coil that is different from the primary coil L1A and the secondary coil L2A is provided, and communication may be performed using a communication method, namely load modulation or the like, using this different coil. Alternatively, communication may be performed by proximity wireless communication using RF or the like.

The power supply unit 57 supplies power to the load 80 based on the power received by the power receiving unit 52. For example, the power supply unit 57 charges the battery 90 by supplying power received by the power receiving unit 52. Alternatively, the power supply unit 57 supplies power from the battery 90 or power received by the power receiving unit 52 to the power supply target 100. Specifically, the power supply unit 57 includes a charging unit 58 and a discharging unit 60. The charging unit 58 performs charging of the battery 90 (charging control). For example, the charging unit 58 is supplied with a voltage that is based on the rectified voltage VCCA (DC voltage, in a broad sense) from the power receiving unit 52, and charges the battery 90. The discharging unit 60 performs a discharging operation for discharging the battery 90.

The detection unit 64 performs various detection operations. Detection of over-discharge, over-voltage, over-current, and abnormal temperature (high temperature, low temperature) are envisioned as detection operations performed by the detection unit 64.

The controller 54 performs various types of control processing on the units of the control device 50 on the power receiving side. The controller 54 can be realized by a logic circuit such as a gate array that is generated by an automated place-and-route method, or various processors such as a microcomputer, for example.

The load 80 includes the battery 90 and the power supply target 100. The power supply target 100 is provided in the electronic apparatus 510 (FIG. 10) that incorporates the power receiving device 40, and is a device that is a power supply target of the battery 90, for example. Note that the power received by the power receiving unit 52 may be directly supplied to the power supply target 100.

7. Operation Sequence of Contactless Power Transmission System

Figure 12:
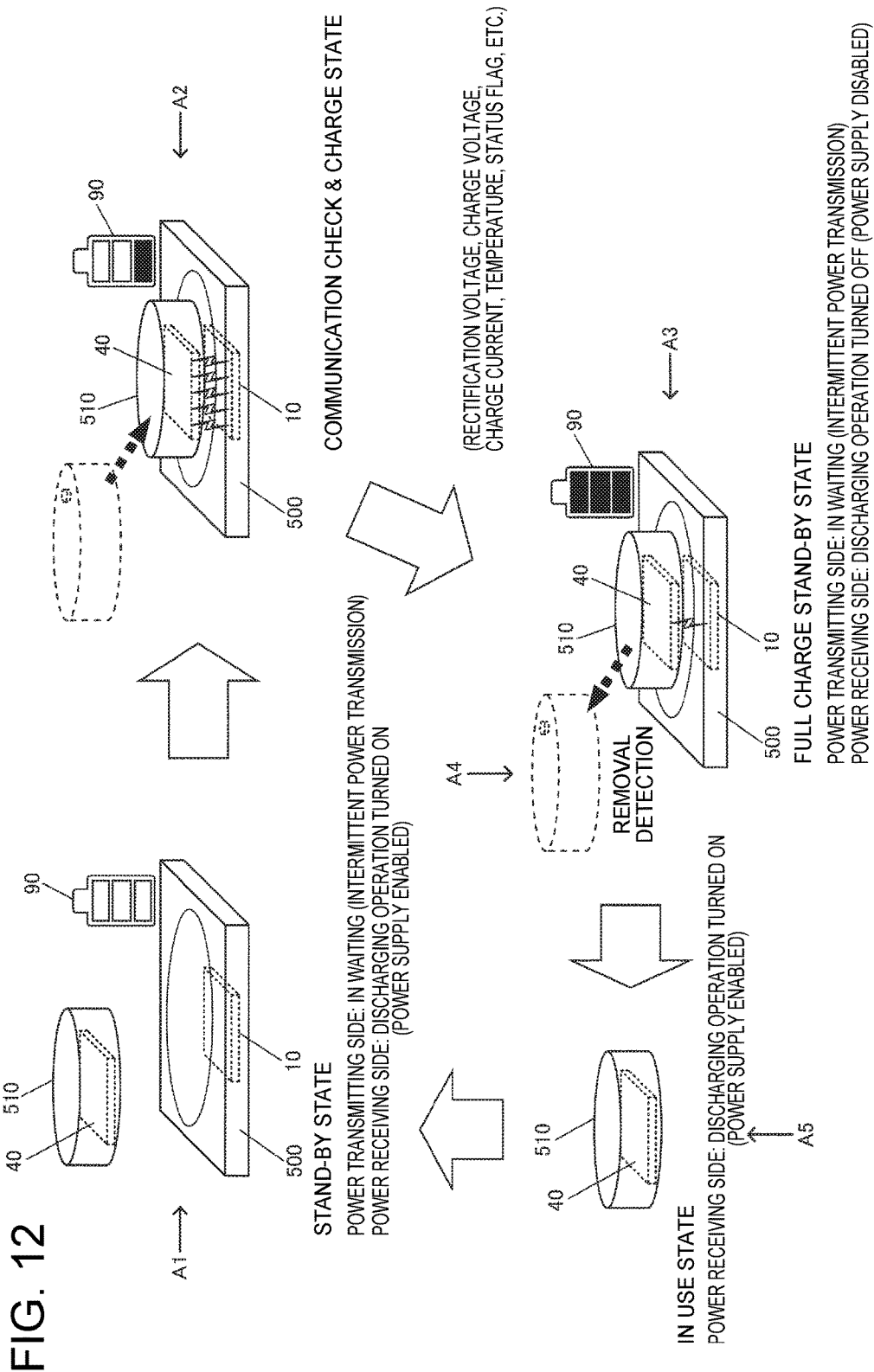
FIG. 12 is a diagram for illustrating an outline of an operation sequence.

Next, an example of an operation sequence of the contactless power transmission system 200 of the present embodiment will be described. FIG. 12 is a diagram for illustrating an outline of an operation sequence. Note that, in the following, description will be given taking the sequence of operations between the power transmitting device 10 and the power receiving device 40 as an example, but the sequence of operations between the power transmitting device 10 and the power receiving device 41 is similar thereto as well. The sequence of operations between the power transmitting device 10 and the power receiving device 40 and the sequence of operations between the power transmitting device 10 and the power receiving device 41 are independently controlled. Note that the phase difference between the drive signals DSA and DSB is controlled with the method described above.

In A1 in FIG. 12, the electronic apparatus 510 including the power receiving device 40 is not placed on the charger 500 including the power transmitting device 10, and is in a removed state. In this case, a stand-by state is realized. In the stand-by state, the power transmitter 12 in the power transmitting device 10 is in a state in which landing of the electronic apparatus 510 is detected by performing intermittent power transmission for landing detection. Also, in the stand-by state, the discharging operation to the power supply target 100 is turned on in the power receiving device 40, and the power supply to the power supply target 100 is enabled. Accordingly, the power supply target 100 such as a processing unit is supplied with the power from the battery 90, and can operate.

As shown in A2 in FIG. 12, when the electronic apparatus 510 is placed on the charger 500, and landing is detected, a communication check & charge state is realized. In the communication check & charge state, the power transmitter 12 in the power transmitting device 10 performs normal power transmission which is continuous power transmission. Here, the power transmitter 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1A and the secondary coil L2A or the like, and can be determined based on information such as the rectified voltage VCCA, which is the output voltage from the power receiving unit 52. The charge state of the battery 90 can be determined based on the information such as the battery voltage VBAT.

Also, in the communication check & charge state, the charging operation of the charging unit 58 in the power receiving device 40 is turned on, and charging of the battery 90 is performed based on the power received by the power receiving unit 52. Also, the discharging operation of the discharging unit 60 is turned off, and power from the battery 90 is not supplied to the power supply target 100. Also, in the communication check & charge state, communication data is transmitted to the power transmitting side by load modulation performed by the load modulation unit 56. For example, communication data including power transmission status information (such as VCCA), charge status information (such as VBAT and various status flags), and information such as a temperature is transmitted from the power receiving side to the power transmitting side by regular load modulation in a normal power transmission period.

As shown in A3 in FIG. 12, when full charge of the battery 90 is detected, a full charge stand-by state is realized. In the full charge stand-by state, the power transmitter 12 is in a state in which intermittent power transmission for removal detection is performed so as to detect removal of the electronic apparatus 510. Also, the discharging operation of the discharging unit 60 remains off, and the power supply to the power supply target 100 remains to be disabled.

When removal of the electronic apparatus 510 is detected as shown in A4 in FIG. 12, the electronic apparatus 510 is in a use state, and the discharging operation of the power receiving side is turned on, as shown in A5 in FIG. 9. Specifically, the discharging operation of the discharging unit 60 is switched from off to on, and the power from the battery 90 is supplied to the power supply target 100 via the discharging unit 60. Accordingly, power from the battery 90 is supplied, the power supply target 100 such as a processing unit operates using the power, and the electronic apparatus 510 is in a state in which a user can use it normally.

Figure 13:
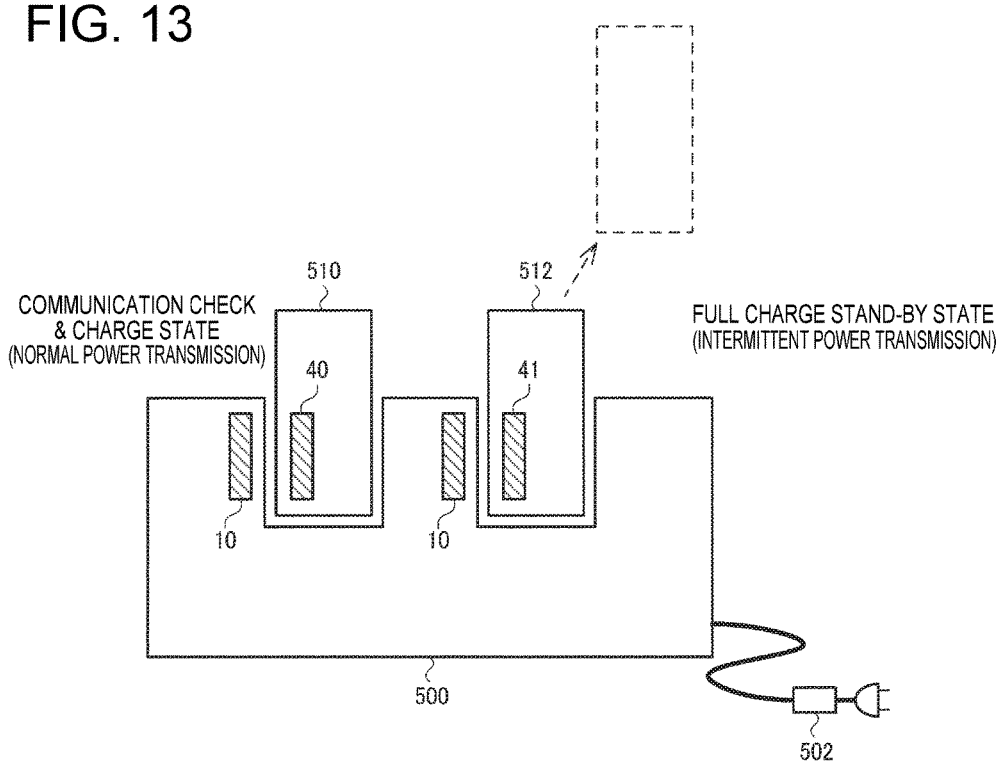
FIG. 13 shows an example of the state to which a method of setting phase difference of the present embodiment can be applied.
Figure 14:
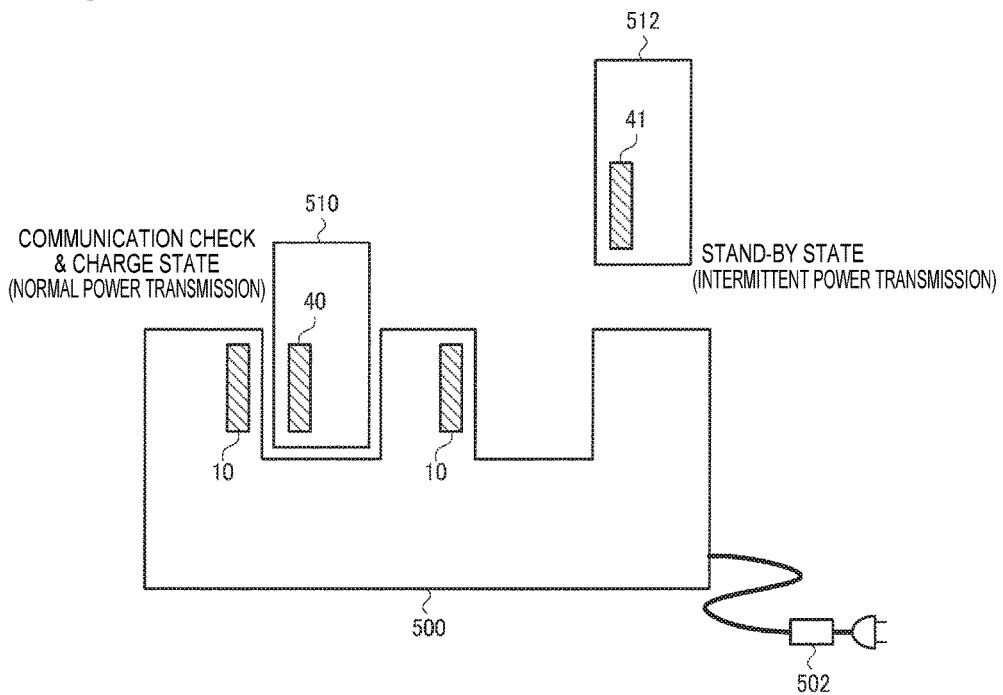
FIG. 14 shows an example of the state to which the method of setting phase difference of the present embodiment can be applied.

FIGS. 13 & 14 show an example of the states to which the method of setting phase difference of the present embodiment described in FIG. 1 and the like can be applied. In FIG. 13, the electronic apparatus 510 is placed on the charger 500, and a communication check & charge state is realized. Meanwhile, full charge of the battery 90 is detected in the electronic apparatus 512, and a full charge stand-by state is realized. In FIG. 14, the electronic apparatus 510 is placed on the charger 500, and a communication check & charge state is realized. Meanwhile, the electronic apparatus 512 is not placed on the charger 500 and is in a removed state, and a stand-by state is realized.

In these states, the power transmitting device 10 performs normal power transmission to the power receiving device 40 of the electronic apparatus 510, and the power transmitting device 10 performs intermittent power transmission to the power receiving device 41 of the electronic apparatus 512. In the present embodiment, the phase difference between the drive signals DSA and DSB that drive the primary coils L1A and L1B is set to a predetermined phase difference (0 degrees, for example) in these states.

Figure 15:
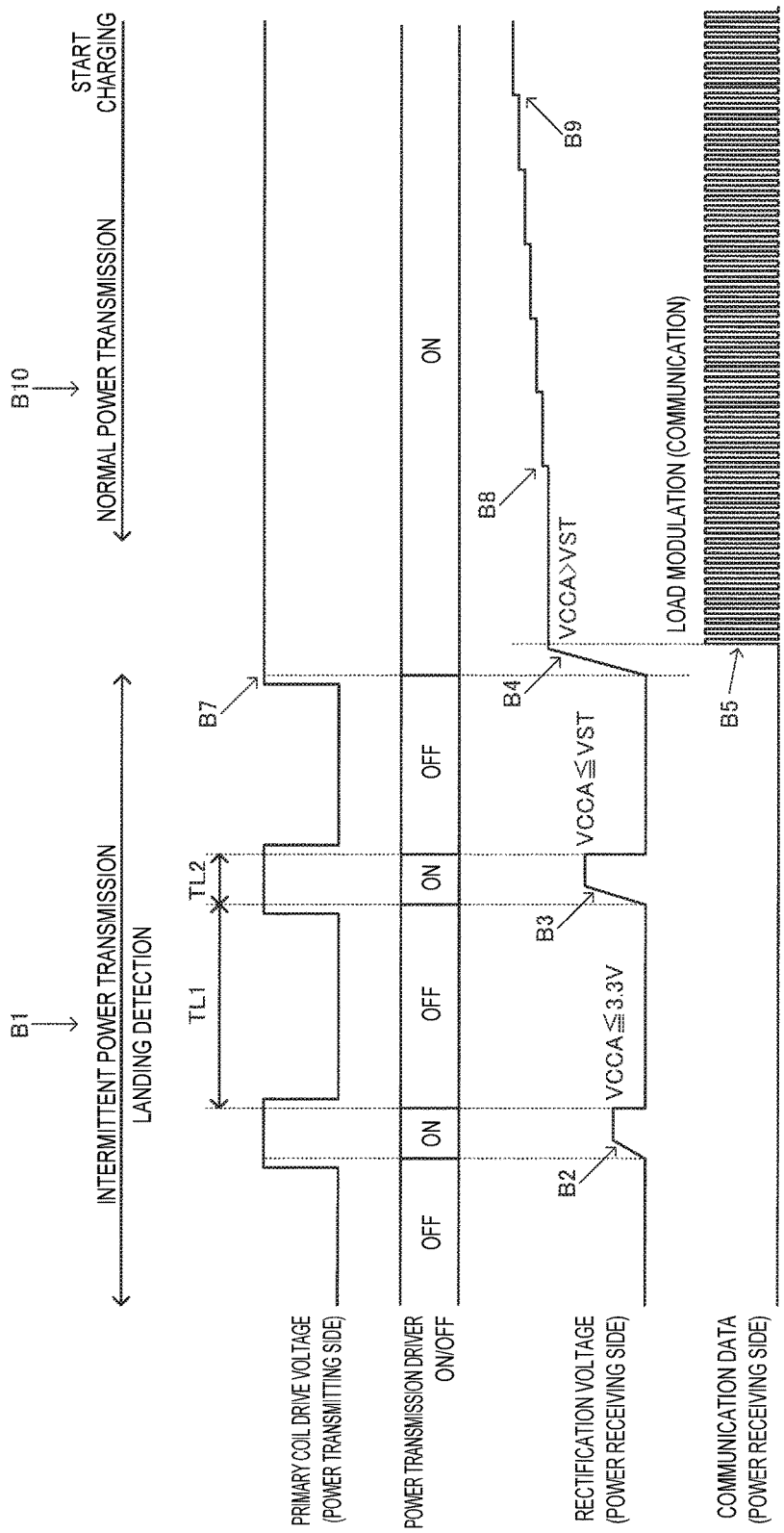
FIG. 15 is a signal waveform diagram for illustrating a detailed operation sequence of the contactless power transmission system of the present embodiment.
Figure 16:
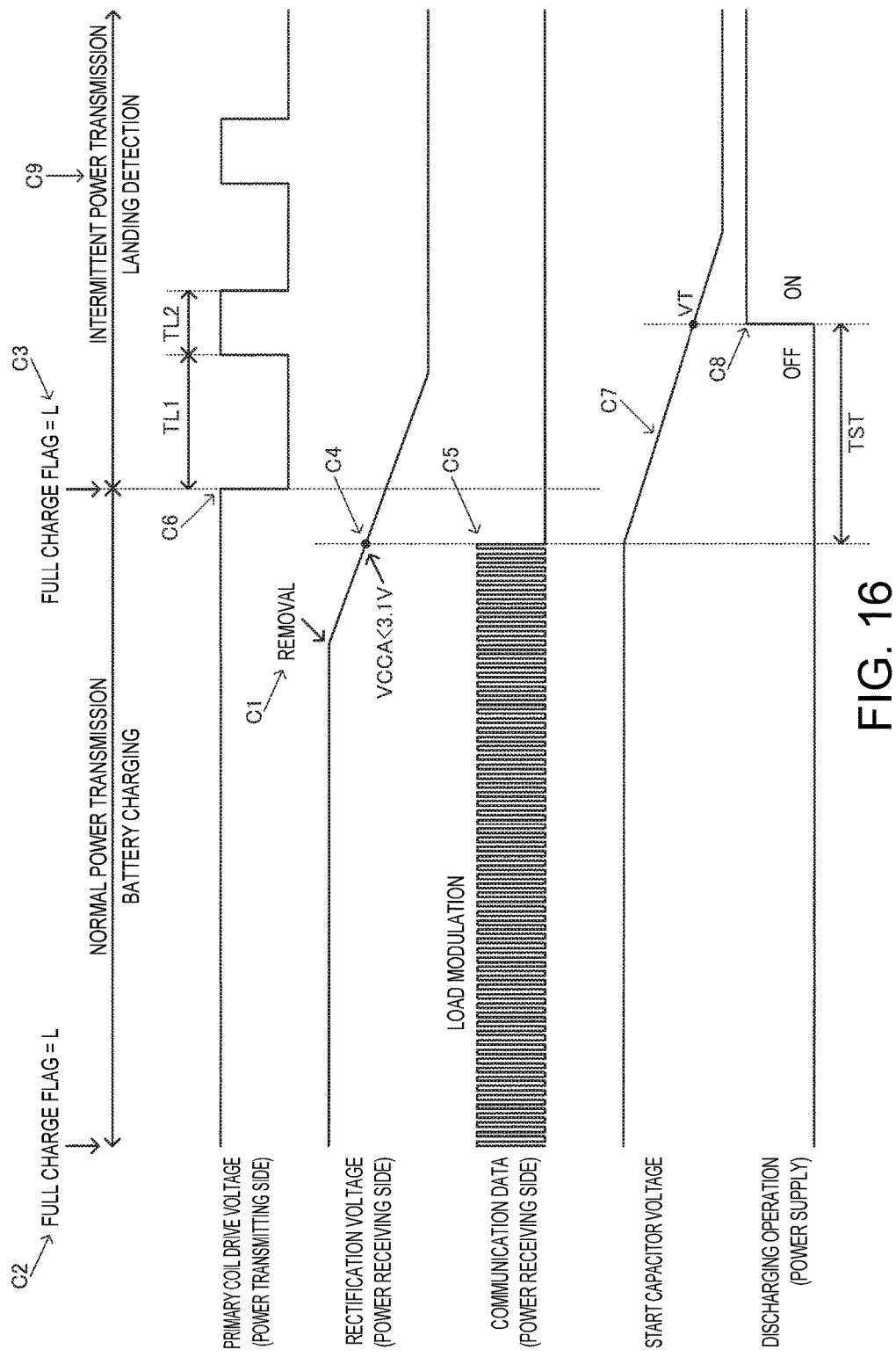
FIG. 16 is a signal waveform diagram for illustrating the detailed operation sequence of the contactless power transmission system of the present embodiment.
Figure 17:
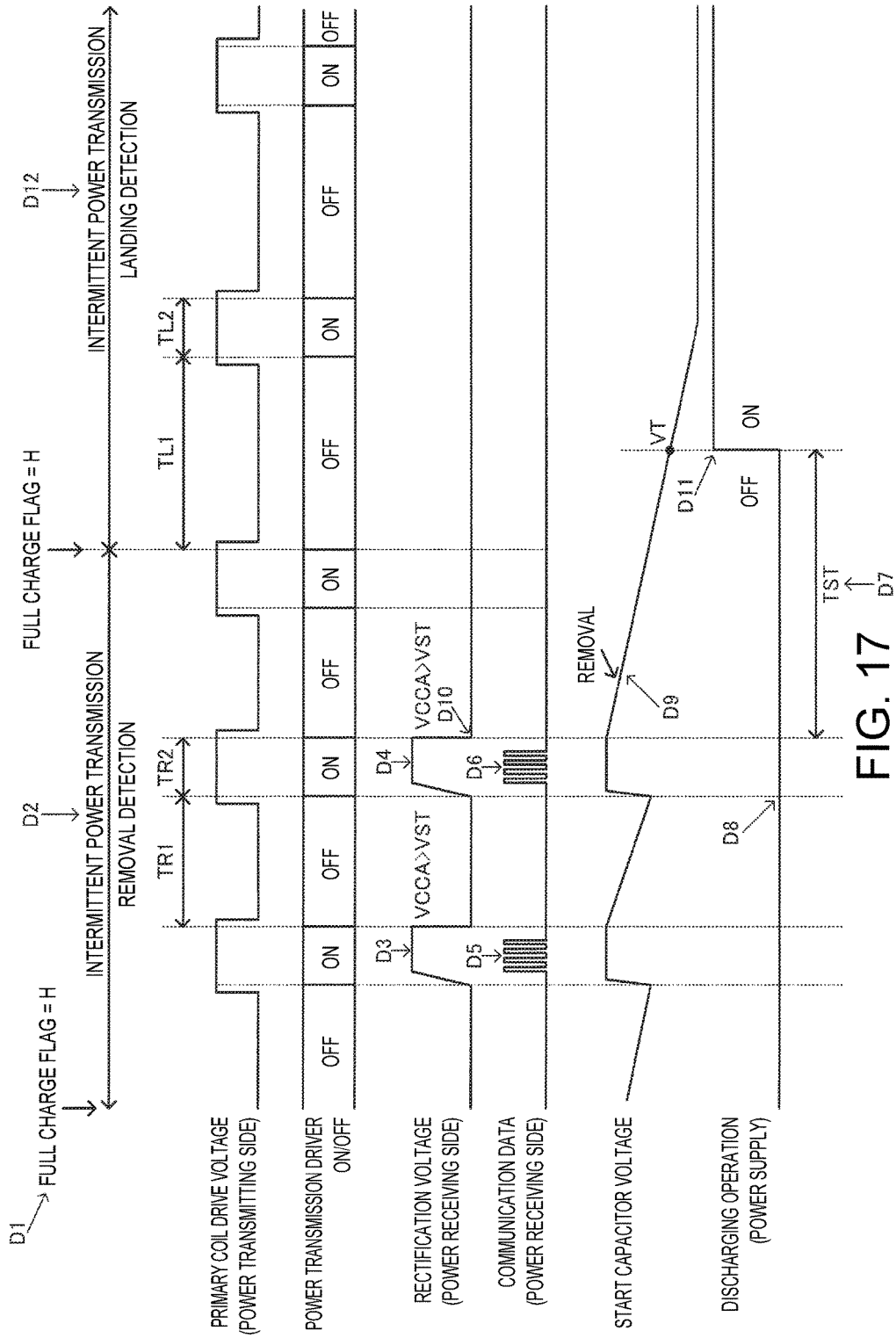
FIG. 17 is a signal waveform diagram for illustrating the detailed operation sequence of the contactless power transmission system of the present embodiment.

FIGS. 15 to 17 are signal waveform diagrams for illustrating a detailed operation sequence of the contactless power transmission system 200 of the present embodiment. Note that, in the following, a description will be given taking the sequence of operations between the power transmitting device 10 and the power receiving device 40 as an example, but the sequence of operations between the power transmitting device 10 and the power receiving device 41 is similar thereto as well.

B1 in FIG. 15 is the stand-by state in A1 in FIG. 12, and intermittent power transmission for landing detection is performed. That is, power transmission in a period TL2 is performed at the intervals of a period TL1. The period of TL1 is 3 s for example, and the period of TL2 is 50 ms for example. In B2 and B3 in FIG. 15, the rectified voltage VCCA is less than or equal to the voltage VST (less than or equal to the first voltage), and therefore, communication by load modulation is not performed.

On the other hand, in B4, the rectified voltage VCCA exceeds the voltage VST (4.5 V, for example) and therefore the load modulation unit 56 starts load modulation, as shown in B5. That is, although the coils L1A and L2A are not in a sufficiently electromagnetically coupled state in B2 and B3, the coils L1A and L2A are in a properly electromagnetically coupled state in B4, as shown in FIG. 11. Accordingly, the rectified voltage VCCA increases and exceeds the voltage VST, and load modulation is started, as shown in B5. Then, communication data as shown in B6 is transmitted to the power transmitting side by this load modulation. The start of the load modulation in B5 is triggered by the increase in the rectified voltage VCCA due to the intermittent power transmission for landing detection shown in B7.

Specifically, the power receiving side transmits dummy data (64 bits of "0", for example) for landing detection. The power transmitting side detects landing of the power receiving side by detecting this dummy data (detecting 8 bits of "0", for example), and starts normal power transmission (continuous power transmission) as shown in B10.

Next, the power receiving side transmits information such as ID information or rectified voltage VCCA. As described above, simplified authentication processing can be realized as a result of the power transmitting side making a reply with respect to the transmission of the ID information.

Also, the power transmitting side controls the transmitting power by receiving the transmitting power setting information, which is information of the rectified voltage VCCA. As a result of the power transmitting side controlling the transmitting power, the rectified voltage VCCA increases as shown in B8. Then, when the VCCA exceeds the voltage VCCL (second voltage), as shown in B9, charging of the battery 90 is started.

In C1 in FIG. 16, the electronic apparatus 510 is removed in a normal power transmission period during which the battery 90 is charged. The removal in C1 is removal before the battery 90 is fully charged (full charge flag=L level), as shown in C2 and C3.

When the electronic apparatus 510 is removed in this way, the power on the power transmitting side is not transmitted to the power receiving side, and the rectified voltage VCCA decreases. Then, when VCCA has decreased below 3.1 V, for example, as shown in C4, load modulation by the load modulation unit 56 is stopped, as shown in C5. When load modulation is stopped, normal power transmission by the power transmitter 12 is stopped, as shown in C6.

Also, the power transmitter 12 starts to perform intermittent power transmission for landing detection, as shown in C9, after normal power transmission has been stopped.

In D1 in FIG. 17, the full charge flag is at a high level which is an active level, and the full charge of the battery 90 is detected. When the full charge is detected in this way, the intermittent power transmission for removal detection after full charge is performed, as shown in D2. That is, power transmission is performed during a period TR2 at the intervals of a period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCCA of the power receiving unit 52 increases above VST due to the intermittent power transmission for removal detection, as shown in D3 and D4 in FIG. 17, and the load modulation is performed as shown in D5 and D6. The fact that the electronic apparatus 510 has not been removed can be detected on the power transmitting side by detecting the load modulation (null communication data or the like).

On the other hand, the electronic apparatus 510 is removed in D9. The discharging operation of the discharging unit 60 is switched from off to on after the period TR2 in which intermittent power transmission for removal detection shown in D4 is performed has ended, and power from the battery 90 begins to be supplied to the power supply target 100. Also, as shown in D12, intermittent power transmission for landing detection of the electronic apparatus 510 starts to be performed.

In the present embodiment as described above, on the condition that the power receiving device 40 has started the load modulation, as shown in B5 in FIG. 15, normal power transmission by the power transmitter 12 is started, as shown in B10. While the load modulation in B5 continues, the normal power transmission shown in B10 continues. Specifically, as shown in C5 in FIG. 16, in the case where load modulation is no longer detected, normal power transmission by the power transmitter 12 is stopped as shown in C6. Then, intermittent power transmission for landing detection by the power transmitter 12 starts to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, contactless power transmission and communication by load modulation can be realized in a simple operation sequence. Also, as a result of performing communication by regular load modulation during a normal power transmission period, effective contactless power transmission according to the state of the power transmission or the like can be realized.

8. Operation Sequence in f2 Communication

Next, f2 communication that is communication from the power transmitting device 10 to the power receiving devices 40 and 41 will be described. FIG. 18 is a diagram for illustrating an example of a method of notifying an issued command from a power transmitting device to a power receiving device when the power receiving device is landed. Note that, in the following, a description will be given taking the sequence of operations between the power transmitting device 10 and the power receiving device 40 as an example, but the sequence of operations between the power transmitting device 10 and the power receiving device 41 is similar thereto as well. The control of the phase difference between the drive signals DSA and DSB in f2 communication will be described later.

The controller 24 of the power transmitting device 10 outputs a control signal to the driver control circuit 22. The driver control circuit 22 generates a control signal having a first power transmission frequency f1, and outputs the generated control signal to the power transmission drivers DR1 and DR2 of the power transmitter 12. Accordingly, the primary coil L1A of the power transmitting device 10 is supplied with a drive signal (amplitude (drive voltage) of the drive signal is shown in FIG. 18) as shown in X1 in FIG. 18. Then, power is transmitted from the power transmitting device 10 to the power receiving device 40 at a first power transmission frequency f1, and the rectification voltage (VCCA) output from the rectifier circuit 53 of the power receiving unit 52 rises. Note that, in FIG. 18, the period in which the power transmission frequency of the drive signal supplied to the primary coil L1A is the first power transmission frequency is denoted by $T_{f1}$, and the period in which the power transmission frequency is a second power transmission frequency is denoted by $T_{f2}$.

When the rectification voltage exceeds the first voltage (VST) as shown in X2, the load modulation unit 56 of the power receiving device 40 transmits communication data to the power transmitting device 10 by performing load modulation as shown in X3. At this time, the load modulation unit 56, after transmitting dummy data (Dummy) for landing detection, transmits ID authentication information (ID information, ID code) for authenticating the power transmitting device 10 to the power transmitting side. In the example in FIG. 18, the power receiving device 40 transmits the ID authentication information twice.

Also, as shown in X4, the controller 54 of the power receiving device 40 measures a reference power transmission frequency in a given period $T_{ref}$ in a first ID communication period. The reference power transmission frequency is a power transmission frequency that is used as the reference for measuring the second power transmission frequency f2. For example, the reference power transmission frequency is the first power transmission frequency f1.

The communication unit 30 of the power transmitting device 10 receives the first ID authentication information transmitted from the power receiving device 40. Next, the controller 24 of the power transmitting device 10 changes the power transmission frequency or the duty at a given timing after the power receiving device 40 has started the load modulation (after the power transmitting device 10 has received the first ID authentication information). For example, the controller 24 of the power transmitting device 10 changes the power transmission frequency from the first power transmission frequency f1 to the second power transmission frequency f2 at a given timing X5 after the power receiving device 40 has started the load modulation. In the example in FIG. 18, the given timing X5 is a timing after the power transmitting device 10 has received the first ID authentication information. At this time, the controller 24 causes the driver control circuit 22 to generate a second control signal having the second power transmission frequency f2 and transmit the second control signal to the power transmission drivers DR1 and DR2 of the power transmitter 12. The controller 24 notifies the power receiving device 40 of an arbitrary issued command by adjusting the length of the period during which the signal having the second power transmission frequency f2 is transmitted.

At this time, the controller 24 of the power transmitting device 10 makes a response to the authentication performed using the ID authentication information by changing the power transmission frequency from the first power transmission frequency f1 to the second power transmission frequency f2 in a response period $T_{RS}$ in a second ID communication period.

Accordingly, the power transmitting device 10 can make a response to the authentication performed using the ID authentication information, and the like, along with notifying of an issued command, for example.

Meanwhile, in the case where the power transmitting device 10 has made a response using the signal having the second power transmission frequency f2 or the signal having the second duty at a given timing (X5) after the load modulation unit 56 has started load modulation, the controller 54 of the power receiving device 40 measures the length of a reception period $T_{MS}$ as shown in X6, and specifies the issued command based on the measured length.

In other words, in the case where the power transmitting device 10 has made a response using the signal having the second power transmission frequency f2 or the signal having the second duty (X5) with respect to the ID authentication information transmitted using load modulation, the controller 54 specifies the issued command based on the length of the reception period $T_{MS}$. For example, in the case where the power transmitting device 10 has made the response shown in X5, the controller 54 of the power receiving device 40 determines that the power receiving device 40 has landed on a proper power transmitting device 10 (charger), and specifies the issued command. On the other hand, in the case where the power transmitting device 10 is only performing power transmission with the first power transmission frequency f1 during the response period $T_{RS}$ as well, the controller 54 determines that a proper response has not been obtained, and does not specify the issued command.

Accordingly, the power receiving device 40 can judge whether or not the power transmitting device 10 has made an appropriate response at a predetermined timing, and thus can perform simplified authentication processing of the power transmitting device 10, and the like. Furthermore, in the case where the power transmitting device 10 has made a normal response, it becomes possible for the power receiving device 40 to specify the issued command that has been transmitted by the power transmitting device 10, and the like.

Thereafter, the controller 54 causes the load modulation unit 56 to transmit confirmation information CI indicating that the power receiving device 40 has received the issued command, using load modulation.

Furthermore, the power transmitting device 10, after notification of the issued command being performed by changing the power transmission frequency to the second power transmission frequency f2 (X7), changes the power transmission frequency to the first power transmission frequency f1 again, and performs power transmission.

The controller 54 of the power receiving device 40, upon judging that the specified issued command is a normal charging command, instructs the charging unit 58 to turn on the power supply switch 42 so as to perform normal charging of the battery 90. Similarly, the controller 54 of the power receiving device 40, upon judging that the specified issued command is a quick charging command, instructs the charging unit 58 to turn on the power supply switch 42 so as to perform quick charging of the battery 90.

Also, in the case where the power transmitting device 10 has not made an appropriate response to the power receiving device 40 with the signal having the second power transmission frequency f2 at the timing X5, the controller 54 of the power receiving device 40 judges that this power transmitting device 10 is an improper power transmitting device. Then, the controller 54 instructs the charging unit 58 to turn off the power supply switch 42 so as to not perform charging of the battery 90.

Next, the control of the phase difference between the drive signals DSA and DSB that drive the primary coils L1A and L1B when f2 communication is performed will be described. Note that, when communication is performed by the change in duty, because the phase difference does not change, the control of phase difference described below need not be performed.

As shown in X5 in FIG. 18, the controller 24 of the power transmitting device 10 performs communication from the power transmitting device 10 to the power receiving device 40 by changing the frequency of the drive signal DSA from the first power transmission frequency f1 to the second power transmission frequency f2. Then, after the communication, the controller 24 resets the phase difference between the drive signal DSA and the drive signal DSB to the predetermined phase difference (0 degrees, for example) as shown in X8.

Specifically, when the frequency of the drive signals DSA and DSB is the first power transmission frequency f1, the phase difference is set to the predetermined phase difference. Then, when the frequency of the drive signal DSA is changed to the second power transmission frequency f2 in the response period $T_{RS}$, the phase difference between the drive signals DSA and DSB shifts from the predetermined phase difference at a point in time when the response period $T_{RS}$ ends. For example, the first and second power transmission frequencies f1 and f2 are assumed to be frequencies resulting from dividing the frequency of the clock signal on the primary side by 121 and 120, respectively. In this case, the phase difference of signals of the first and second power transmission frequencies f1 and f2 changes by ((121−120)/121)×360 degrees=(1/121)×360 degrees per cycle. For example, if the response period $T_{RS}$ corresponds to 64 cycles of the drive signal DSA, the phase difference between the drive signals DSA and DSB shifts by (64/121)×360 degrees.

In the present embodiment, the aforementioned shift can be corrected and the phase difference between the drive signals DSA and DSB can be returned to the predetermined phase difference by resetting the phase difference. That is, as shown in X8 in FIG. 18, the controller 24 of the power transmitting device 10 sets the frequency of the drive signal DSA to the second power transmission frequency f2 in a period $T_{RS}'$ after the response period $T_{RS}$. The period $T_{RS}'$ is a period in which the phase difference that has been shifted in the response period $T_{RS}$ can be corrected. Specifically, in the case where the $T_{RS}$ and the $T_{RS}'$ respectively correspond to N and M cycles of the drive signal DSA, and the phase difference between signals of the first and second power transmission frequencies f1 and f2 changes by (1/K)×360 degrees per cycle, the length of the period $T_{RS}'$ is set such that N+M is a multiple of K. For example, in the example described above, since 64+57=121, the period $T_{RS}'$ is set so as to correspond to 57 cycles of the drive signal DSA. In this way, the phase difference between the drive signals DSA and DSB changes by a multiple of 360 degrees in total of the periods $T_{RS}$ and $T_{RS}'$, and the phase difference can be returned to the original predetermined phase difference.

Also, the controller 24 of the power transmitting device 10 causes the power transmission driver 18 to transmit the drive signal DSA having the first power transmission frequency f1 to the power receiving device 40. Then, in the case of issuing a first command to the power receiving device 40, the controller 24 causes the power transmission driver 18 to transmit the drive signal DSA having the second power transmission frequency f2 that is different from the first power transmission frequency f1 during a period having a first length. On the other hand, in the case of issuing a second command that is different from the first command to the power receiving device 40, the controller 24 causes the power transmission driver 18 to transmit the drive signal DSA having the second power transmission frequency f2 during a period having a second length that is different from the first length.

The second power transmission frequency f2 is a frequency higher than the first power transmission frequency f1, for example. The first and second lengths of period (response period $T_{RS}$) during which the drive signal DSA having the second power transmission frequency f2 is transmitted are respectively 64 cycles and 128 cycles of the drive signal DSA. Note that the first and second lengths are not limited thereto. The first command is the normal charging command, for example, and the second command is the rapid charging command. The normal charging command is a command for instructing the power receiving device 40 to perform normal charging. Also, the quick charging command is a command for instructing the power receiving device 40 to perform quick charging whose speed of charging is faster than the normal charging. For example, the quick charging is a charging method in which the time it takes to fully charge the battery is shorter than the normal charging in the case of the same remaining battery amount. For example, in the case of CC charging, the normal charging command is a command to charge the battery with a first charging current, and the quick charging command is a command to charge the battery with a second charging current that is larger than the first charging current. Note that the commands that the power transmitting device 10 issues to the power receiving device 40 are not limited thereto. For example, the command may be an off-start command. The off-start command is a command for forcibly turning off the power supply operation from the discharging unit 60 to the power supply target 100. For example, when a product is shipped or the like, the off-start command is issued, and the power supply operation in the power receiving device 40 is turned off after charging before shipment.

In this way, in the present embodiment, the power transmission frequency is set to the second power transmission frequency f2 in periods having various lengths corresponding to various commands, and communication is performed for transmitting the commands. When the length of the period changes, the shift in the phase difference between the drive signals DSA and DSB takes various values. In this regard, according to the present embodiment, the phase difference between the drive signals DSA and DSB can be reset to the predetermined phase difference, corresponding to the various commands, as a result of resetting the phase difference between the drive signals DSA and DSB to the predetermined phase difference after communication.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. The control device, the power transmitter, the power transmitting device, the power receiving device, the contactless power transmission system, the electronic apparatus, and the like are not limited to those described in this embodiment either, and various modifications can be implemented.

This application claims priority from Japanese Patent Application No. 2016-211720 filed in the Japanese Patent Office on Oct. 28, 2016, the entire disclosure of which is hereby incorporated by reference in its entirely.

What is claimed is:

1. A control device that controls a first power transmission driver that applies a first drive signal to a first primary coil and a second power transmission driver that applies a second drive signal to a second primary coil, the control device comprising:
a controller,
wherein, when intermittent power transmission is performed by applying the second drive signal in a period in which normal power transmission is performed by applying the first drive signal, the controller sets a phase difference between the first drive signal and the second drive signal to a predetermined phase difference.

2. The control device according to claim 1, wherein the predetermined phase difference is 0 degrees.

3. The control device according to claim 1, wherein the controller variably sets the phase difference between the first drive signal and the second drive signal.

4. The control device according to claim 3, wherein the controller variably sets the phase difference such that the phase difference will be one of at least two of 0 degrees, 90 degrees, and 180 degrees.

5. The control device according to claim 3, wherein the controller differs the phase difference between the first drive signal and the second drive signal when normal power transmission is performed by the first power transmission driver and intermittent power transmission is performed by the second power transmission driver from the phase difference between the first drive signal and the second drive signal when normal power transmission is performed by the first power transmission driver and the second power transmission driver.

6. The control device according to claim 5,
wherein the controller
sets the phase difference to 0 degrees when normal power transmission is performed by the first power transmission driver and intermittent power transmission is performed by the second power transmission driver, and
sets the phase difference to 90 degrees when normal power transmission is performed by the first power transmission driver and the second power transmission driver.

7. The control device according to claim 1,
wherein the control device includes:
a first communication unit that receives communication data from a first power receiving device by detecting a current that flows to the first power transmission driver from a power supply; and
a second communication unit that receives communication data from a second power receiving device by detecting a current that flows to the second power transmission driver from the power supply.

8. The control device according to claim 1,
wherein, when communication is performed from a power transmitting device to a first power receiving device by changing the frequency of the first drive signal from a first power transmission frequency to a second power transmission frequency that is different from the first power transmission frequency, the control device resets the phase difference between the first drive signal and the second drive signal to the predetermined phase difference after the communication.

9. The control device according to claim 8,
wherein, the controller, after causing the first power transmission driver to transmit the first drive signal having the first power transmission frequency to the first power receiving device,
when a first command is issued to the first power receiving device, causes the first power transmission driver to transmit the first drive signal having the second power transmission frequency during a period having a first length, and
when a second command that is different from the first command is issued to the first power receiving device, causes the first power transmission driver to transmit the first drive signal having the second power transmission frequency during a period having a second length that is different from the first length.

10. A power transmitting device comprising the control device according to claim 1.

11. The power transmitting device according to claim 10, comprising:
- a first placement portion onto which a first electronic apparatus that is to be charged by a power signal from the first primary coil is placed, and
- a second placement portion onto which a second electronic apparatus that is to be charged by a power signal from the second primary coil is placed.

12. A contactless power transmission system including the power transmitting device according to claim 10, a first power receiving device, and a second power receiving device,
- wherein, when intermittent power transmission to the second power receiving device is performed by applying the second drive signal in a period during which normal power transmission to the first power receiving device is performed by applying the first drive signal, the phase difference between the first drive signal and the second drive signal is set to a predetermined phase difference.

13. An electronic apparatus comprising the control device according to claim 1.

* * * * *